US008768611B2

(12) United States Patent
Sosulin et al.

(10) Patent No.: US 8,768,611 B2
(45) Date of Patent: Jul. 1, 2014

(54) OBJECT DETECTION AND POSITION DETERMINATION BY REFLECTED GLOBAL NAVIGATION SATELLITE SYSTEM SIGNALS

(75) Inventors: Yury G. Sosulin, Moscow (RU); Dmitry V. Tatarnikov, Moscow (RU)

(73) Assignee: Topcon Positioning Systems Inc., Livermore, CA (US)

( * ) Notice: Subject to any disclaimer, the term of this patent is extended or adjusted under 35 U.S.C. 154(b) by 162 days.

(21) Appl. No.: 13/454,192

(22) Filed: Apr. 24, 2012

(65) Prior Publication Data
US 2012/0277988 A1 Nov. 1, 2012

Related U.S. Application Data

(60) Provisional application No. 61/479,902, filed on Apr. 28, 2011.

(51) Int. Cl.
*G06F 17/00* (2006.01)
*G06F 19/00* (2011.01)
*G01S 19/14* (2010.01)
*G01S 19/22* (2010.01)
*G01S 19/35* (2010.01)

(52) U.S. Cl.
USPC ........ 701/408; 701/468; 701/478.5; 701/300; 342/357.52; 342/357.61; 342/357.75

(58) Field of Classification Search
USPC ......... 701/1, 23, 41, 116, 117, 400, 408, 409, 701/410, 412, 414, 416, 445, 448, 450, 468, 701/469, 470, 472, 473, 478.5, 479, 300, 701/301; 340/988, 989, 995.14, 995.28; 342/350, 351, 352, 356, 357.2, 357.21, 342/357.22, 357.23, 357.25, 357.28, 342/357.29, 357.34, 357.39, 357.51, 342/357.52, 357.61, 357.71, 357.75
See application file for complete search history.

(56) References Cited

U.S. PATENT DOCUMENTS 4,954,999 A * 9/1990 Teel et al. ........................ 367/97
5,187,485 A 2/1993 Tsui et al.
(Continued)

FOREIGN PATENT DOCUMENTS

WO WO 2009/039161 3/2009

OTHER PUBLICATIONS

Lu, Yilong, et al., "An Experimental GSM Based Passive Radar", Proceedings of Asia-Pacific Microwave Conference 2006, Dec. 1, 2006, pp. 1626-1629.

(Continued)

*Primary Examiner* — Thomas Tarcza
*Assistant Examiner* — Edward Pipala
(74) *Attorney, Agent, or Firm* — Wolff & Samson PC

(57) ABSTRACT

A navigation receiver mounted on a moving vehicle receives navigation signals transmitted from global navigation satellites. The navigation signals are separated into direct navigation signals, navigation signals reflected from an object, and navigation signals reflected from an environmental surface. The signal separation is based on algorithms including various combinations of signal strength, change in signal strength, delay time, spectral width, change in spectral width, and user-defined thresholds. The navigation signals reflected from an environmental surface are eliminated from further processing. The position of the navigation receiver is calculated based on the direct navigation signals. The object is detected, and the position of the object is calculated, based on the navigation signals reflected from the object. If the object is determined to lie in the path of the moving vehicle, a command can be generated to avoid collision between the moving vehicle and the object.

39 Claims, 11 Drawing Sheets

(56) References Cited

U.S. PATENT DOCUMENTS

| | | | |
|---|---|---|---|
| 5,589,836 A * | 12/1996 | Noetzel | 342/357.25 |
| 5,606,506 A * | 2/1997 | Kyrtsos | 701/472 |
| 6,031,882 A | 2/2000 | Enge et al. | |
| 6,232,922 B1 | 5/2001 | McIntosh | |
| 2006/0077094 A1 | 4/2006 | Eisenstein | |
| 2008/0129587 A1 | 6/2008 | DiEsposti et al. | |

OTHER PUBLICATIONS

Jiang, Yi, et al., "A New Rake-Based Multipath Estimation Algorithm in GNSS Receivers", 2010 3rd International Congress on Image and Signal Processing, Oct. 16, 2010, pp. 4313-4317.

Gustafson D.E., et al., "Innovative Indoor Geolocation Using RF Multipath Diversity", Position, Location, and Navigation Symposium, Apr. 25-27, 2006, pp. 904-912.

Griffiths, Hugh, et al., "The Signal and Interference Environment in Passive Bistatic Radar", Information, Decision and Control, Feb. 1, 2007, pp. 1-10.

PCT International Search Report, dated Jul. 19, 2012, corresponding to PCT Application No. PCT/IB2012/000795 filed Apr. 24, 2012 (4 pages).

PCT Written Opinion of the International Searching Authority, dated Jul. 19, 2012, corresponding to PCT Application No. PCT/IB2012/000795 filed Apr. 24, 2012 (6 pages).

* cited by examiner

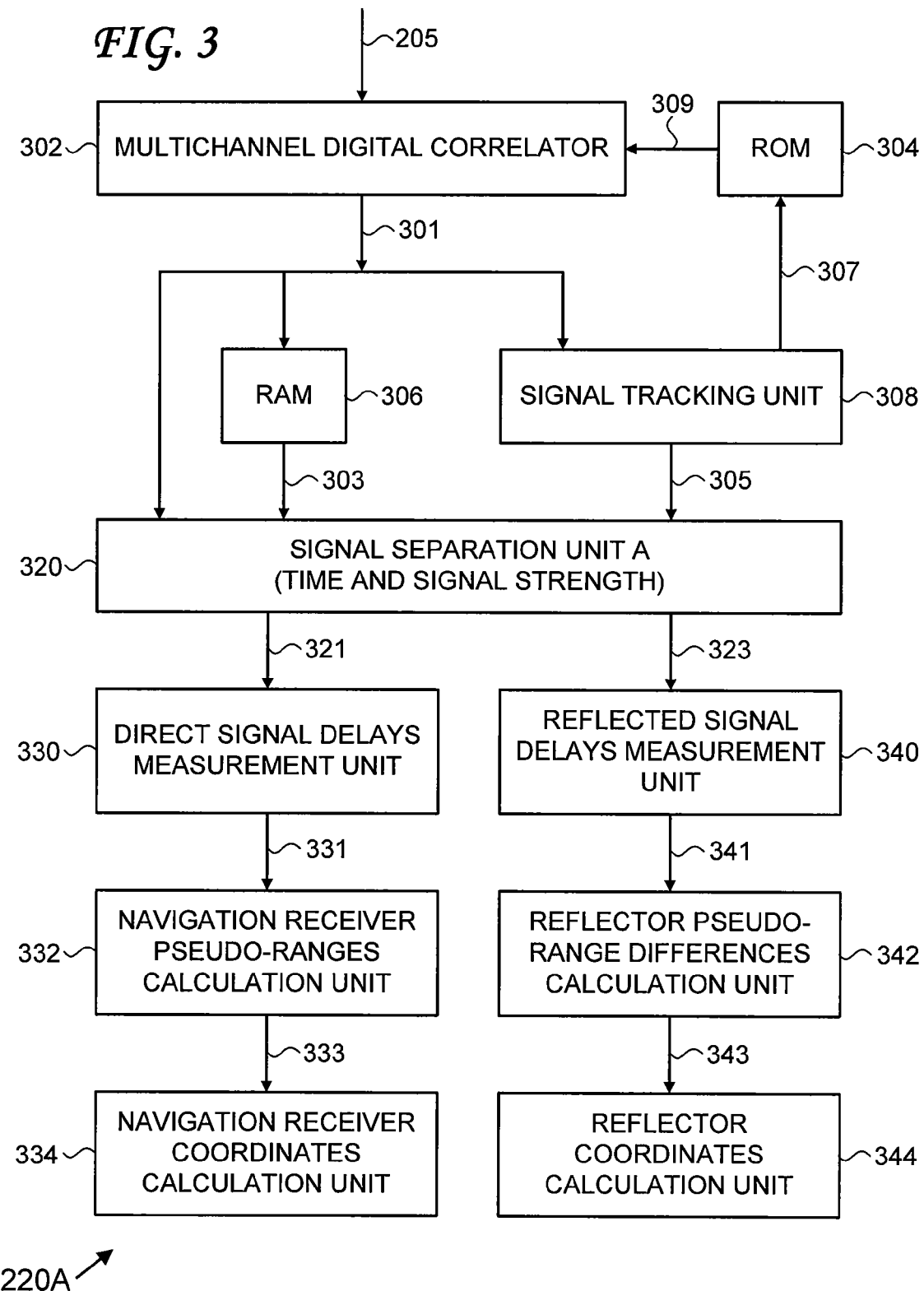

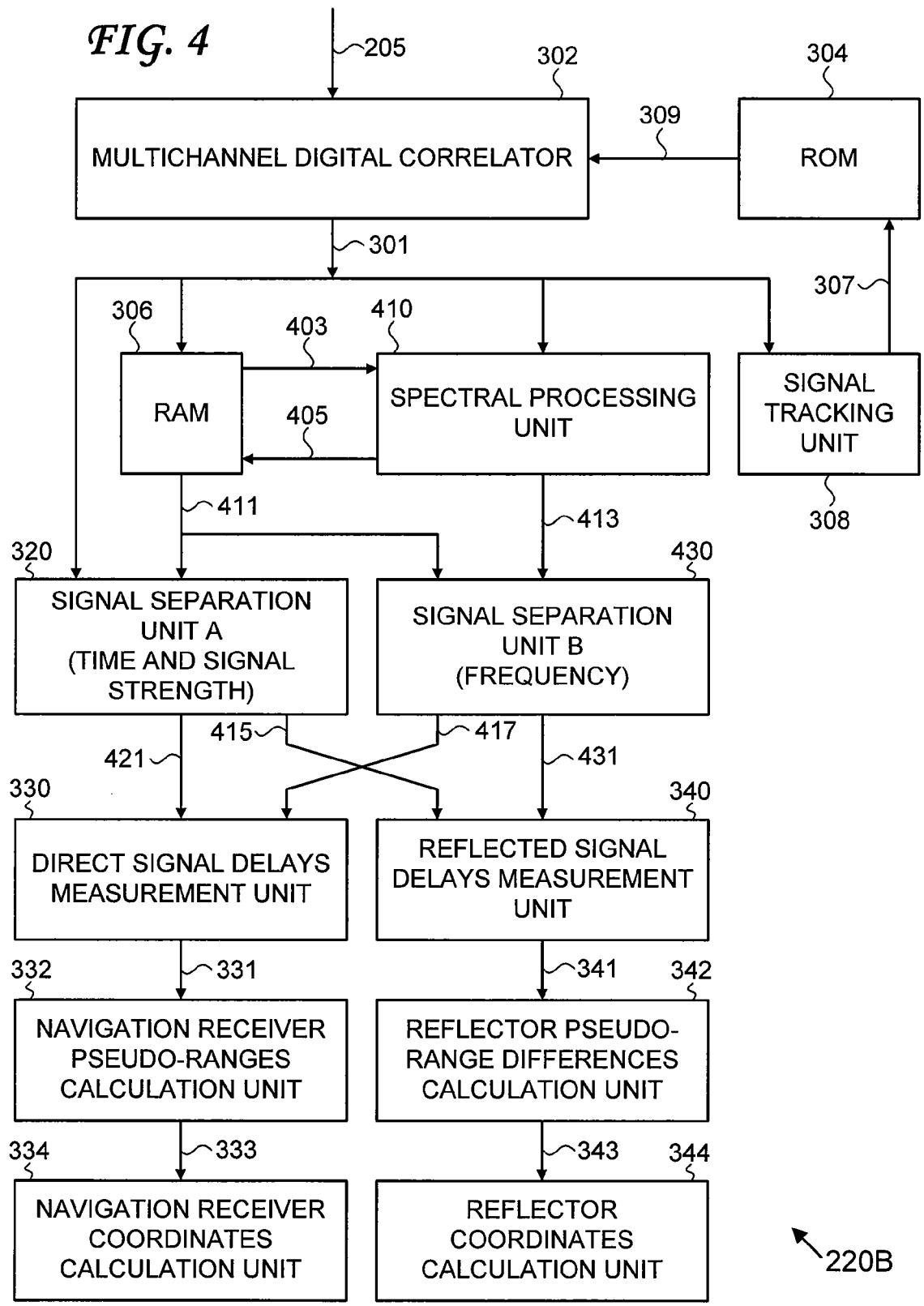

OBJECT DETECTION AND POSITION DETERMINATION BY REFLECTED GLOBAL NAVIGATION SATELLITE SYSTEM SIGNALS

This application claims the benefit of U.S. Provisional Application No. 61/479,902 filed Apr. 28, 2011, which is incorporated herein by reference.

BACKGROUND OF THE INVENTION

The present invention relates generally to object detection and position determination, and more particularly to object detection and position determination by reflected global navigation satellite signals.

Global navigation satellite systems (GNSSs) can determine locations with high accuracy. Currently deployed GNSSs include the United States Global Positioning System (GPS) and the Russian GLONASS. Other GNSSs, such as the European GALILEO system, are under development. GNSSs are used in a wide range of applications, such as surveying, geology, and mapping.

In a GNSS, a navigation receiver receives and processes radio signals transmitted by satellites located within a line-of-sight of the navigation receiver; the line-of-sight signals are referred to as direct signals. The satellite signals comprise carrier signals modulated by pseudo-random binary codes. The navigation receiver measures the time delays of the received signals relative to a local reference clock. Code measurements enable the navigation receiver to determine the pseudo-ranges between the navigation receiver and the satellites. The pseudo-ranges differ from the actual ranges (distances) between the navigation receiver and the satellites due to various error sources and due to variations in the time scales of the satellites and the navigation receiver. If signals are received from a sufficiently large number of satellites, then the measured pseudo-ranges can be processed to determine the code coordinates and time scales at the navigation receiver.

Navigation receivers can also receive satellite signals that are reflected from the general environment, such as the ground, and from specific structures, such as buildings. These reflected signals, referred to as multipath signals, degrade the accuracy of the code coordinates determined by the navigation receiver. For high-accuracy measurements, navigation receivers are designed to reduce the effect of multipath signals. For examples, specially-designed antennas can reduce the multipath signals initially received, and signal processing algorithms can separate multipath signals from direct signals.

Reflected signals, however, can be used to detect and determine the position of specific objects. One method is described in U.S. Patent Application Publication No. 2008/0129587 ("DiEsposti"). A GPS-enabled receiver receives direct signals from GPS satellites and reflected signals from a reflector. The direct signals are isolated from the reflected signals based on their time delays and amplitudes. The position of the receiver is determined from the direct signals, and the position of the reflector is determined from the reflected signals. The described method, however, assumes a substantially isotropic reflector, and, furthermore, does not account for reflections from the general environment.

BRIEF SUMMARY OF THE INVENTION

A navigation receiver mounted on a moving vehicle receives groups of navigation signals from multiple navigation satellites. Each of navigation signals corresponds to a particular navigation satellite. Each group of navigation signals is separated into a first set of navigation signals and a second set of navigation signals. Each navigation signal in the first set of navigation signals is a direct navigation signal, and each navigation signal in the second set of navigation signals is a reflected navigation signal. The second set of navigation signals is further separated into two subsets of navigation signals. Each navigation signal in the first subset of navigation signals is a navigation signal reflected from an object, and each navigation signal in the second subset of navigation signals is a navigation signal reflected from an environmental surface.

The navigation signals are separated into direct navigation signals, navigation signals reflected from objects, and navigation signals reflected from the environmental surface based on algorithms including various combinations of signal strength, change in signal strength, delay time, spectral width, change in spectral width, and user-defined thresholds.

Detection of the object and the position of the object is determined from the navigation signals reflected from the object; the position of the navigation receiver is determined from the direct navigation signals; and the navigation signals reflected from the environmental surface are eliminated from further processing. If the object is determined to lie in the path of the moving vehicle, a command is generated to avoid a collision between the moving vehicle and the object.

These and other advantages of the invention will be apparent to those of ordinary skill in the art by reference to the following detailed description and the accompanying drawings.

BRIEF DESCRIPTION OF THE DRAWINGS

FIG. 3 shows a high-level schematic of a first embodiment of a processing unit;

FIG. 4 shows a high-level schematic of a second embodiment of a processing unit;

DETAILED DESCRIPTION

Figure 1:
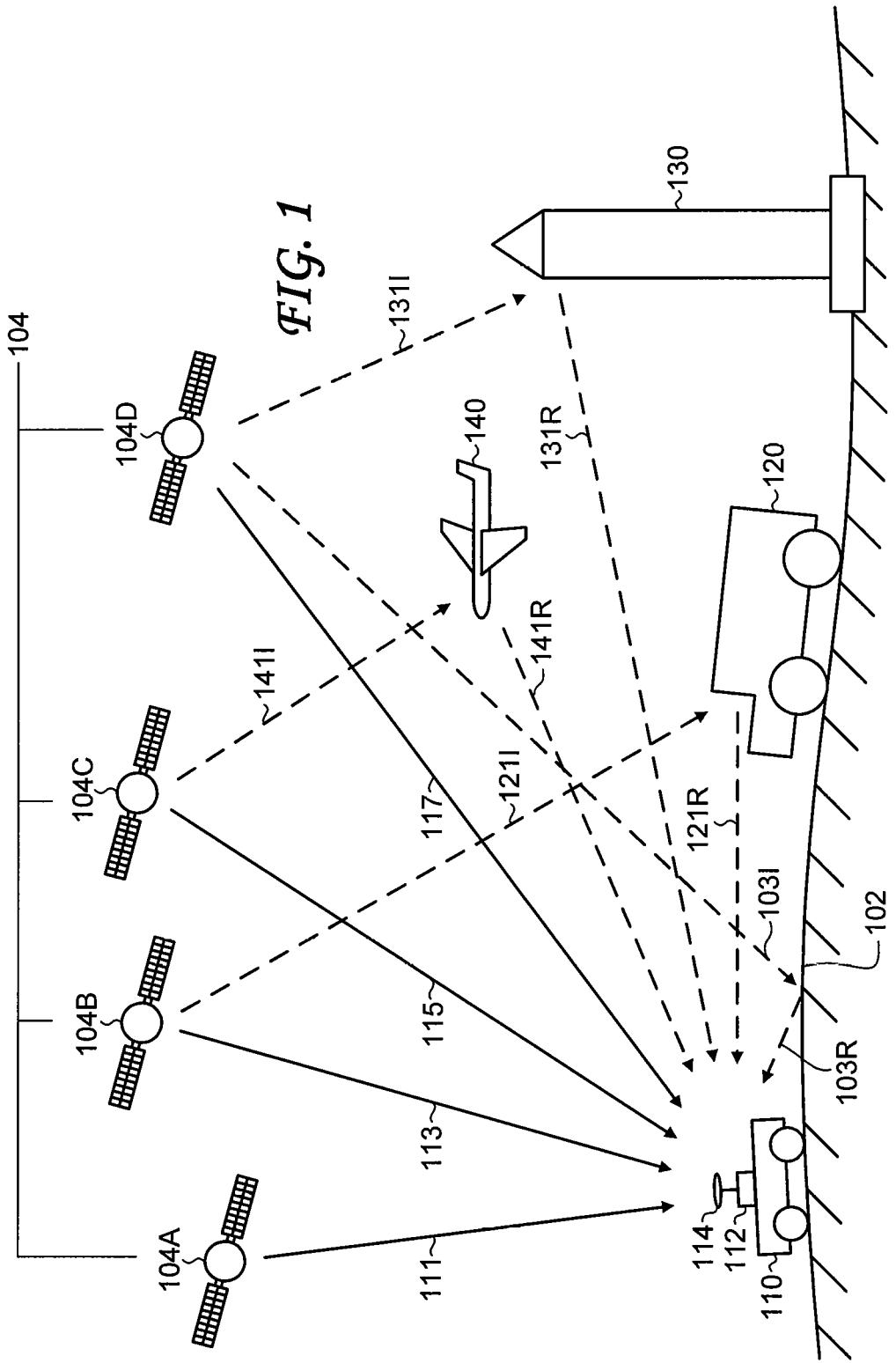
FIG. 1 shows a high-level schematic of a general signal reception environment.

FIG. 1 shows a high-level schematic of a general signal reception environment. A constellation of global navigation satellites 104 transmits navigation signals. Shown are four representative navigation satellites, denoted navigation satellite 104A, navigation satellite 104B, navigation satellite 104C, and navigation satellite 104D. A navigation receiver 112 is outfitted with an antenna 114. The antenna 114 receives the direct navigation signal 111 from the navigation satellite 104A, the direct navigation signal 113 from the navigation satellite 104B, the direct navigation signal 115 from the navigation satellite 104C, and the direct navigation signal 117 from the navigation satellite 104D.

The navigation receiver 112 and the antenna 114 are mounted on a vehicle 110 travelling along an environmental surface 102. In the example shown in FIG. 1, the vehicle 110 is a land vehicle, such as a car or construction vehicle, and the environmental surface 102 is a ground surface. In a second example, the vehicle 110 is a marine vehicle, such as a boat, and the environmental surface 102 is a water surface. In a third example, the vehicle 110 is an airborne vehicle, such as an airplane, flying over the environmental surface 102, which can be a ground surface or a water surface. In general, the environmental surface in a region around the vehicle can include both ground surfaces and water surfaces; for example, the vehicle (land vehicle, marine vehicle, or airborne vehicle) can be travelling near a coastline.

In addition to the direct navigation signals, the antenna 114 also receives navigation signals reflected from the environmental surface 102 and from various objects. In FIG. 1, three representative objects are shown: object 120, a mobile object such as a construction truck travelling along the environmental surface 102; object 130, a fixed object such as a building erected on the environmental surface 102; and object 140, an airborne object such as an airplane flying over the environmental surface 102. In general, objects can include artificial (man-made) objects (such as vehicles, buildings, and towers) and natural objects (such as trees, boulders, and cliffs). As discussed below, signals reflected from an environmental surface can be distinguished from signals reflected from an object based on characteristics of the reflected signals.

Shown in FIG. 1 are several representative reflected navigation signals. The navigation signal 103I from the navigation satellite 104D is incident on the environmental surface 102; the reflected navigation signal 103R is received by the antenna 114. The navigation signal 121I from the navigation satellite 104B is incident on the object 120; the reflected navigation signal 121R is received by the antenna 114. The navigation signal 131I from the navigation satellite 104D is incident on the object 130; the reflected navigation signal 131R is received by the antenna 114. The navigation signal 141I from the navigation satellite 104C is incident on the object 140; the reflected navigation signal 141R is received by the antenna 114. Under certain scenarios, a navigation receiver can receive reflected navigation signals even if it does not receive direct navigation signals.

Herein, a group of navigation signals corresponding to a satellite refers to navigation signals originating from the same satellite. The group of navigation signals includes direct navigation signals, navigation signals reflected from objects, and navigation signals reflected from environmental surfaces. The navigation signals originating from the same satellite are identified by the pseudo-random number code that uniquely identifies the satellite. The pseudo-random number code is encoded in the navigation signals.

Detection of the presence of an object and determination of the position of the object are important processes in many applications. For example, if the navigation receiver 112 is incorporated into an automatic vehicle guidance system for the vehicle 110, the automatic vehicle guidance system should have the capability to determine whether the vehicle 110 is on a collision course with an object. If the vehicle 110 is on a collision course with an object, then the automatic vehicle guidance system should take appropriate action; for example, send an alarm to an operator, stop the vehicle, or steer the vehicle to avoid the object.

In most instances, the distinction between an object and an environmental surface is clear. A road, a field, and a lake are unambiguous examples of environmental surfaces. A truck, a wall, and a tree are unambiguous examples of objects. In some instances, however, the distinction between an object and an environmental surface may be blurred. Rocks with dimensions on the order of 0.1 m scattered over a field would probably be considered part of an environmental surface; and rocks with dimensions on the order of 1 m would probably be considered objects (boulders). Consider rocks of intermediate size (for example, 0.2-0.3 m), however. Are they considered part of an environmental surface, or are they considered objects? There is not a definitive size limit such that if a rock has a size less than the limit it is considered part of the environmental surface and if a rock has a size greater than the limit it is considered an object.

In the context of an automatic vehicle guidance system, the distinction between an object and an environmental surface becomes even more complex. One criterion is that the impact between a vehicle and an object will damage the vehicle and the impact between a vehicle and a feature on an environmental surface will not damage the vehicle. Whether the vehicle is damaged, however, depends on a multitude of parameters, including the type of vehicle and the speed of the vehicle. A rock that can damage a sports car travelling at high speed, for example, may have no effect at all on a bulldozer travelling at low speed. Similarly, a hill may correspond to an object or an environmental surface depending on the profile of the hill (including parameters such as elevation, slope, and change in slope), on the type of vehicle, and on the speed of the vehicle.

To accommodate a wide range of scenarios, algorithms discussed below distinguish between navigation signals reflected from an object and navigation signals reflected from an environmental surface based on various characteristics of the reflected navigation signals, including signal strength, change in signal strength, time delay, spectral width, and change in spectral width. The algorithms incorporate various user-defined threshold values for assigning (classifying) a reflected navigation signal as a navigation signal reflected from an object or as a navigation signal reflected from an environmental surface. By specifying specific threshold values, the user specifies what is an object and what is an environmental surface for the particular application of interest.

Figure 2:
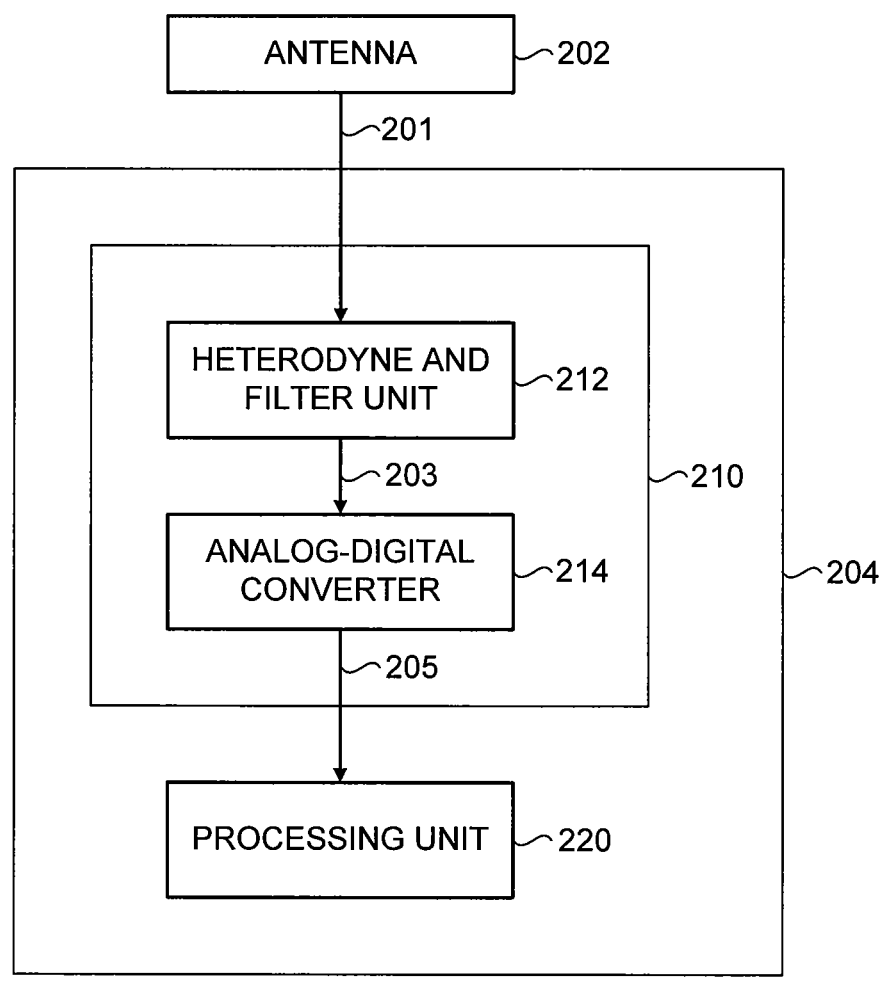
FIG. 2 shows a high-level schematic of a navigation receiver.

FIG. 2 shows a high-level schematic of a navigation receiver 204, according to an embodiment of the invention. The navigation receiver 204 includes a pre-processing unit 210 and a processing unit 220. The pre-processing unit 210 includes a heterodyne and filter unit 212 and an analog-digital converter 214.

Navigation signals, both direct and reflected, are received by the antenna 202. The output signal 201 of the antenna 202 is fed into the input of the heterodyne and filter unit 212. The output signal 203 of the heterodyne and filter unit 212 is fed into the input of the analog-digital converter 214. The output digital signal 205 of the analog-digital converter 214 is fed into the input of the processing unit 220.

Two embodiments of the processing unit 220 are described below. In the first embodiment, denoted processing unit 220A and shown in FIG. 3, direct navigation signals and reflected navigation signals are characterized by their propagation times and their signal strengths. In the second embodiment, denoted processing unit 220B and shown in FIG. 4, direct navigation signals and reflected navigation signals are characterized by their propagation times, signal strengths, and frequency spectra. The architectures of the two embodiments are first described; details of their operations then follow.

A high-level schematic of the processing unit 220A is shown in FIG. 3. The output digital signal 205 of the analog-digital converter 214 (FIG. 2) is fed into an input of the multichannel digital correlator (MDC) 302. The output 301 of the MDC 302 is fed into the input of the random access memory (RAM) 306, the input of the signal tracking unit 308, and an input of the signal separation unit A 320. As discussed in more detail below, the signal separation unit A 320 separates direct navigation signals from reflected navigation signals based on time and signal strength. The output 307 of the signal tracking unit 308 is fed into the input of the read-only memory (ROM) 304. The output 309 of the ROM 304 is fed into an input of the MDC 302.

The output digital signal 205 includes navigation signals (direct and reflected) from multiple navigation satellites. The navigation signal from a specific satellite is identified by a unique pseudo-random number (PRN) code. The reference PRN codes are stored in the ROM 304. For each received navigation signal, the signal tracking unit 308 adjusts the delay of the received navigation signal relative to the reference signal with the same PRN code. For each channel (corresponding to a specific satellite) of the MDC 302, the output 301 is proportional to the cross-correlation function of the received navigation signal and its reference signal.

The output 303 of the RAM 306 is fed into an input of the signal separation unit A 320. The output 305 of the signal tracking unit 308 is fed into an input of the signal separation unit A 320. The output 321 of the signal separation unit A 320 is fed into the input of the direct signal delays measurement unit 330. The output 331 of the direct signal delays measurement unit 330 is fed into the input of the navigation receiver pseudo-ranges calculation unit 332. The output 333 of the navigation receiver pseudo-ranges calculation unit 332 is fed into the input of the navigation receiver coordinates calculation unit 334, which calculates the coordinates of the navigation receiver.

Return now to the signal separation unit A 320. The output 323 of the signal separation unit A 320 is fed into the input of the reflected signal delays measurement unit 340. The output 341 of the reflected signal delays measurement unit 340 is fed into the input of the reflector pseudo-range differences calculation unit 342. The output 343 of the reflector pseudo-range differences calculation unit 342 is fed into the input of the reflector coordinates calculation unit 344, which calculates the coordinates of the reflector.

A high-level schematic of the processing unit 220B is shown in FIG. 4. The output digital signal 205 of the analog-digital converter 214 (FIG. 2) is fed into an input of the multichannel digital correlator (MDC) 302. The output 301 of the MDC 302 is fed into the input of the random access memory (RAM) 306, the input of the signal tracking unit 308, an input of the signal separation unit A 320, and an input of the spectral processing unit 410. The output 307 of the signal tracking unit 308 is fed into the input of the read-only memory (ROM) 304. The output 309 of the ROM 304 is fed into an input of the MDC 302.

The output 403 of the RAM 306 is fed into an input of the spectral processing unit 410. The output 411 of the RAM 306 is fed into an input of the signal separation unit A 320 and into an input of the signal separation unit B 430. As discussed in more detail below, the signal separation unit B 430 separates direct navigation signals from reflected navigation signals based on frequency. The output 413 of the spectral processing unit 410 is fed into an input of the signal separation unit B 430.

The output 421 of the signal separation unit A 320 is fed into an input of the direct signal delays measurement unit 330. The output 415 of the signal separation unit A 320 is fed into an input of the reflected signal delays measurement unit 340. The output 431 of the signal separation unit B 430 is fed into an input of the reflected signal delays measurement unit 340. The output 417 of the signal separation unit B 430 is fed into an input of the direct signal delays measurement unit 330.

The output 331 of the direct signal delays measurement unit 330 is fed into the input of the navigation receiver pseudo-ranges calculation unit 332. The output 333 of the navigation receiver pseudo-ranges calculation unit 332 is fed into the input of the navigation receiver coordinates calculation unit 334, which calculates the coordinates of the navigation receiver.

Return now to the signal separation unit B 430. The output 431 of the signal separation unit B 430 is fed into the input of the reflected signal delays measurement unit 340. The output 341 of the reflected signal delays measurement unit 340 is fed into the input of the reflector pseudo-range differences calculation unit 342. The output 343 of the reflector pseudo-range differences calculation unit 342 is fed into the input of the reflector coordinates calculation unit 344, which calculates the coordinates of the reflector.

Direct navigation signals and reflected navigation signals originating from a specific navigation satellite can be identified by a specific pseudo-random number code. The direct navigation signals and the reflected navigation signals can be separated based on propagation time and signal strength. Reflected navigation signals have greater propagation times than direct navigation signals because the propagation paths of reflected navigation signals are longer than the propagation paths of direct navigation signals. Reflected navigation signals have smaller signal strengths than direct navigation signals because there are signal losses at the reflecting boundaries.

Figure 5A:
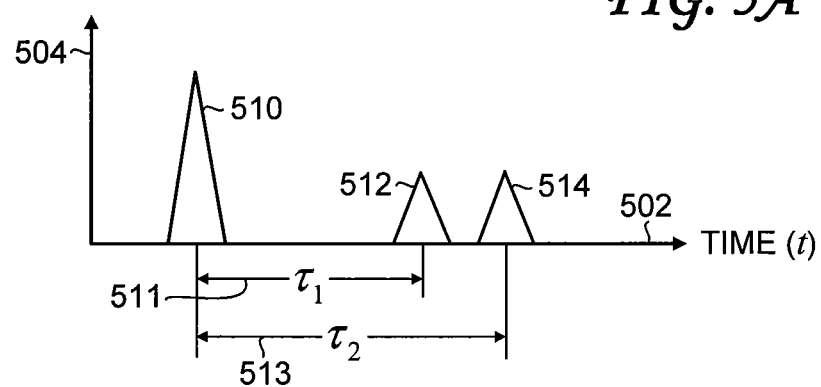
FIG. 5A-FIG. 5C show plots of direct and reflected signals as a function of time.

FIG. 5A shows plots of signal strength as a function of time for three representative navigation signals. The propagation time (t) is plotted along the horizontal axis 502; the signal strength is plotted along the vertical axis 504. Shown are a direct navigation signal 510, a first reflected navigation signal 512, and a second reflected navigation signal 514. The signal strength of the direct navigation signal 510 is greater than the signal strength of the reflected navigation signal 512 and the signal strength of the reflected navigation signal 514. The propagation delay between the reflected navigation signal 512 and the direct navigation signal 510 is $\tau_1$ 511. The propagation delay between the reflected navigation signal 514 and the direct navigation signal 510 is $\tau_2$ 513.

Refer to FIG. 3. In the signal separation unit A 320, direct navigation signals and reflected navigation signals are separated based on signal-strength thresholds and propagation delays. As discussed above, the navigation signal from a specific satellite is identified by a unique pseudo-random number (PRN) code. The reference PRN codes are stored in the ROM 304.

Two user-defined thresholds, a threshold H and a threshold h, where H>h, are assigned. The value of the threshold H is assigned based on the acquisition failure probability of the direct signal. The value of the threshold h is assigned based on the acquisition failure probability value of the reflected signal; it depends on the scattering properties of the environmental surface and the object.

Figure 9:
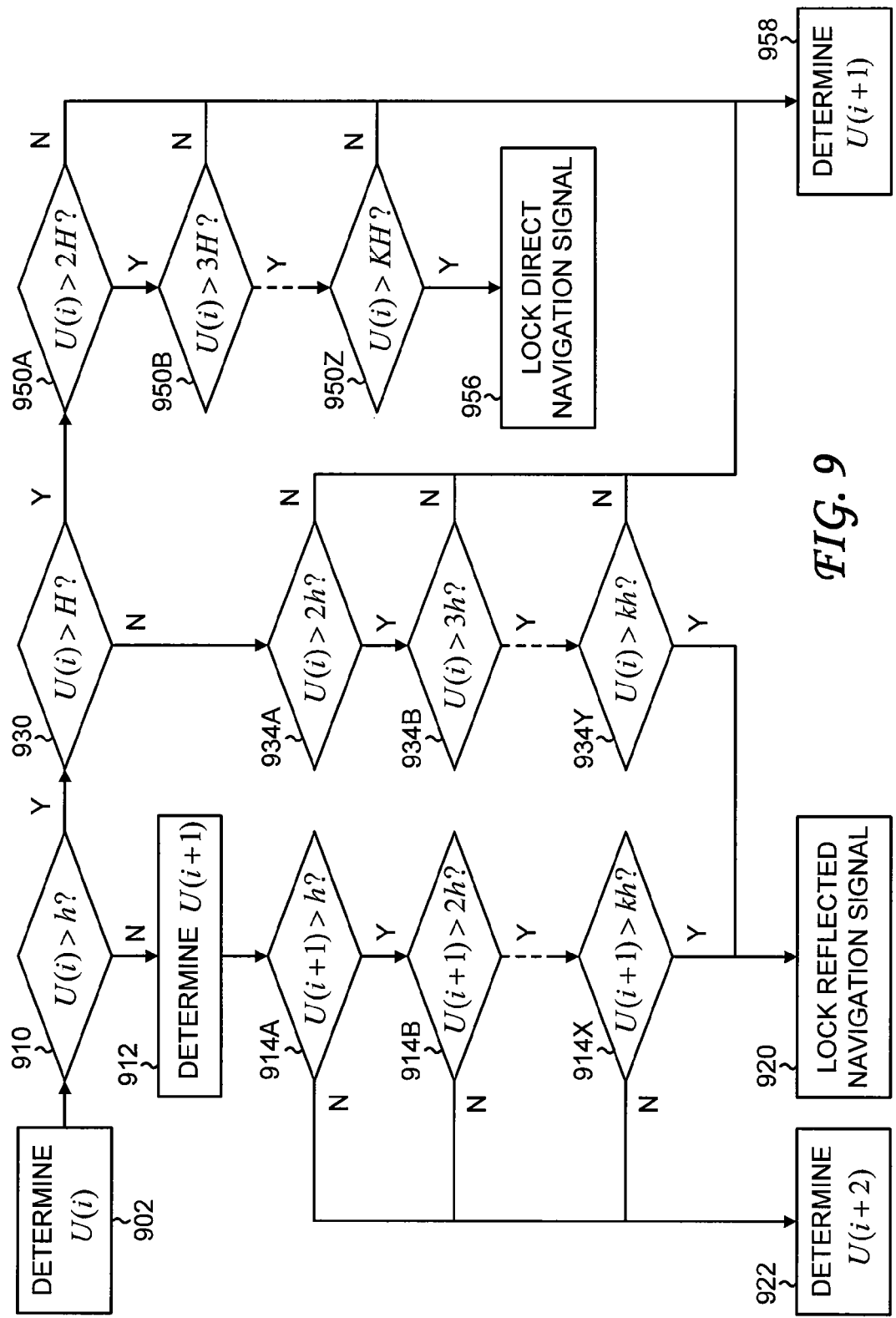
FIG. 9 shows a flowchart of a method for separating direct and reflected navigation signals based on signal strength and time characteristics.

Searching for direct and reflected navigation signals is implemented by a sequential adjustment of the PRN code, recorded in the ROM 304, corresponding to the PRN code of the navigation signal from the j-th satellite. An algorithm for separation of signals based on signal strength and time characteristics is described below and summarized in the flowchart shown in FIG. 9.

In step 902, the magnitude of the digital signal from the output of the j-th channel of the MDC 302 at the i-th time instant, U(i), is determined. The conditions under which the direct navigation signal is acquired and locked-in is first described. In step 910, U(i) is compared with the threshold h. If U(i)>h, then the process passes to step 930, in which U(i) is compared with the threshold H. If U(i)>H, then the value of U(i) is stored. The process then passes to step 950A, in which the stored value of U(i) is compared with the threshold 2H.

Figure 5B:
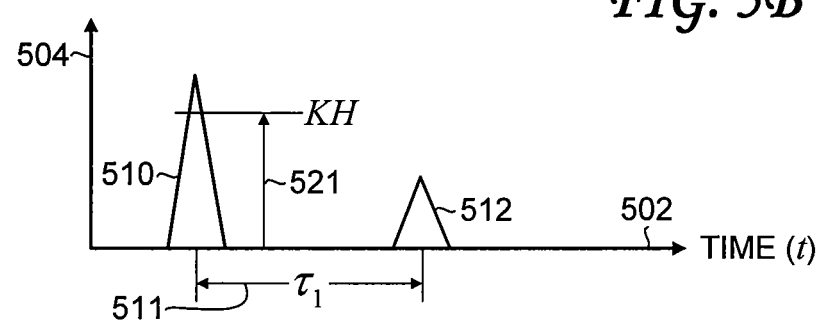

The process is sequentially iterated in step 950A-step 950Z for increasing threshold values 2H, 3H, . . . , KH, where K is a user-defined maximum integer. The maximum threshold KH, shown schematically as KH 521 in FIG. 5B, is determined by the required reliability parameters of acquiring and locking in the direct navigation signal. If the stored value U(i) sequentially exceeds each of the corresponding thresholds H, 2H, 3H, . . . , KH, then the process passes to step 956, and a decision about acquiring and locking in the direct navigation signal is reached. This procedure increases the reliability of locking in the direct navigation signal. In general, the sequence of thresholds do not need to be integer multiples; the sequence can be a user-defined sequence of increasing thresholds.

Return now to step 950A-step 950Z. At each step, if U(i) does not exceed the corresponding threshold, then the process passes to step 958, in which the value U(i+1) at the (i+1)-th time instant is determined. U(i+1) is then compared with a sequence of increasing thresholds. If the stored value U(i+1) sequentially exceeds each of the corresponding thresholds, then a decision about acquiring and locking in the direct navigation signal is reached. If U(i+1) does not exceed a corresponding threshold, then the value U(i+2) at the (i+2)-th time instant is determined. U(i+2) is then compared with a sequence of increasing thresholds. If needed, the process is further iterated; that is, the value of U at the next time instant is determined and compared with a sequence of increasing thresholds.

The locked direct navigation signal, referenced in FIG. 3 as output 321, is fed into the input of the direct signal delays measurement unit 330 to calculate the direct navigation signal pseudo-delay between the navigation receiver and the navigation satellite. Direct navigation signal pseudo-delays are similarly calculated between the navigation receiver and multiple navigation satellites (typically four or more). The direct navigation signal pseudo-delays, referenced as output 331, are fed into the input of the navigation receiver pseudo-ranges calculation unit 332. From the direct navigation signal pseudo-delays, the navigation receiver pseudo-ranges calculation unit 332 calculates the pseudo-ranges, denoted output 333, between the navigation receiver and the navigation satellites. The output 333 is fed into the input of the navigation receiver coordinates calculation unit 334. From the pseudo-ranges, the navigation receiver coordinates calculation unit 334 calculates the coordinates (position) of the navigation receiver. Algorithms executed by the navigation receiver pseudo-ranges calculation unit 332 and by the navigation receiver coordinates calculation unit 334 are discussed in more detail below.

The conditions under which the reflected navigation signal is acquired and locked-in are now described. Return now to step 930. If U(i) does not exceed H, then the process passes to step 934A, in which the value U(i) is compared with the threshold 2h. If U(i)>2h, then the value of U(i) is stored. The process then passes to step 934B, in which the stored value of U(i) is compared with the threshold 3h.

Figure 5C:
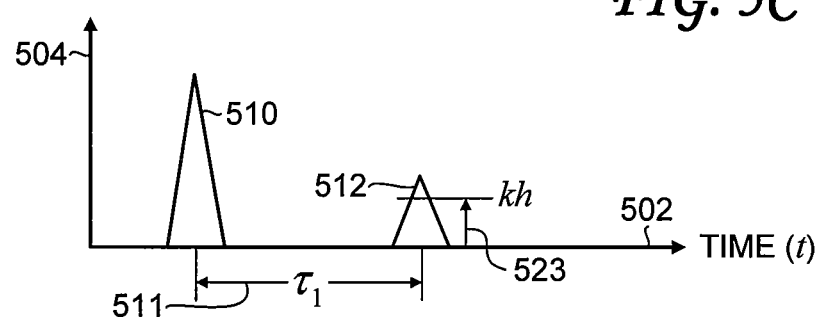

The process is sequentially iterated in step 934A-step 934Y for increasing threshold values 2h, 3h, . . . , kh, where k is a user-defined maximum integer. The maximum threshold kh, shown schematically as kh 523 in FIG. 5C, is determined by the required reliability parameters of acquiring and locking in the reflected navigation signal. If the stored value U(i) sequentially exceeds each of the corresponding thresholds h, 2h, 3h, . . . , kh, then the process passes to step 920, and a decision about acquiring and locking in the reflected navigation signal is reached. This procedure increases the reliability of locking in the reflected navigation signal. In general, the sequence of thresholds do not need to be integer multiples; the sequence can be a user-defined sequence of increasing thresholds.

Return now to step 934A-step 934Y. At each step, if U(i) does not exceed the corresponding threshold, then the process passes to step 958, in which the value U(i+1) at the (i+1)-th time instant is determined. U(i+1) is then compared with a sequence of increasing thresholds. If the stored value U(i+1) sequentially exceeds each of the corresponding thresholds, then a decision about acquiring and locking in the reflected navigation signal is reached. If U(i+1) does not exceed a corresponding threshold, then the value U(i+2) at the (i+2)-th time instant is determined. The stored value of U(i+2) is then compared with a sequence of increasing thresholds. If needed, the process is further iterated; that is, the value of U at the next time instant is determined and compared with a sequence of increasing thresholds.

Return now to step 910. If U(i) does not exceed h, then the process passes to step 912, in which the value U(i+1) at the (i+1)-th time instant is determined. In step 914A, U(i+1) is compared with the threshold h. If U(i+1)>h, then the value of U(i+1) is stored. The process then passes to step 914B, in which the stored value of U(i+1) is compared with the threshold 2h.

The process is sequentially iterated in step 914A-step 914X for increasing threshold values h, 2h, . . . , kh, where k is the user-defined maximum integer discussed above. If the stored value U(i+1) sequentially exceeds each of the corresponding thresholds h, 2h, 3h, . . . , kh, then the process passes to step 920, and a decision about acquiring and locking in the reflected navigation signal is reached.

Return now to step 914A-step 914X. At each step, if U(i+1) does not exceed the corresponding threshold, then the process passes to step 922, in which the value U(i+2) at the (i+2)-th time instant is determined. U(i+2) is then compared with a sequence of increasing thresholds. If the stored value U(i+2) sequentially exceeds each of the corresponding thresholds, then a decision about acquiring and locking in the reflected navigation signal is reached. If U(i+2) does not exceed a corresponding threshold, then the value U(i+3) at the (i+3)-th time instant is determined. The stored value of U(i+3) is then compared with a sequence of increasing thresholds. If needed, the process is further iterated; that is, the value of U at the next time instant is determined and compared with a sequence of increasing thresholds.

The source of the reflected signal (environmental surface or object) needs to be identified. When a signal reflects from an environmental surface, the signal strength of the reflected signal fluctuates within a small range due to changes in the reflection region, as well as due to mechanical vibrations of the upper layers of the environmental surface. When a signal reflects from an artificial or natural reflector (object), however, the signal strength of the reflected signal tends to vary (increase or decrease) as a function of time, since the distance between the moving navigation receiver and the object is varying (increasing or decreasing) as a function of time; refer back to FIG. 1. A third threshold, h+Δh, where h+Δh<H, is used to separate navigation signals reflected from the environmental surface from navigation signals reflected from an object.

For collision avoidance, detection of an approaching object is important. If the signal strength of the reflected navigation signal increases over a few tracking cycles (the number of tracking cycles is user-defined), and the signal strength U(i) of the output 301 from the MDC 302 exceeds the threshold h+Δh, such that h+Δh<U(i)<H, the navigation signal reflected from an approaching object is acquired and locked in. The value of the threshold h+Δh is set such that the increase in the reflected signal strength due to a decrease in the distance between a vehicle and an object is reliably detected. As Δh increases, the probability of not detecting an approaching object increases (the rate of false negatives increases). As Δh decreases, the probability of mis-identifying fluctuations in signals reflected from the environmental surface as signals reflected from an approaching object increases [the rate of false positives (false alarms) increases]. If h<U(i)≤h+Δh, the reflected navigation signal is presumed to be reflected from an environmental surface.

Note that depending on the mutual positions of the navigation satellite, the navigation receiver, and the object, the navigation receiver can receive navigation signals reflected from the object even if the navigation receiver does not receive direct navigation signals from the navigation satellite.

The value of Δh is then set according to a user-defined acceptable balance between a user-defined detection sensitivity and a user-defined false-alarm rate. Referring back to FIG. 1, if the vehicle 110 is on a collision course with an object, such as the object 120, an automatic navigation system can take appropriate action; for example, send an alarm to a system operator, stop the vehicle, or steer the vehicle to avoid the object.

The locked reflected navigation signal, referenced as output 323 in FIG. 3, is fed into the input of the reflected signal delays measurement unit 340 to calculate the reflected navigation signal pseudo-delay between the navigation receiver and the navigation satellite. Reflected navigation signal pseudo-delays are similarly calculated between the navigation receiver and multiple navigation satellites.

The reflected navigation signal pseudo-delays, referenced as output 341, are fed into the input of the reflector pseudo-range differences calculation unit 342. From the reflected navigation signal pseudo-delays, the reflector pseudo-range differences calculation unit 342 calculates differences in pseudo-ranges, denoted output 343. The output 343 is fed into the input of the reflector coordinates calculation unit 344. From the differences in pseudo-ranges, the reflector coordinates calculation unit 344 calculates the coordinates (position) of the reflector. Algorithms executed by the reflector pseudo-range differences calculation unit 342 and by the reflector coordinates calculation unit 344 are discussed in more detail below.

If the signal strength of the reflected navigation signal does not increase over a few tracking cycles, then the reflected navigation signal is presumed to result from a reflection from the environmental surface. Reflected navigation signals reflected from the environmental surface are excluded from further processing.

Direct navigation signals and reflected navigation signals can also be distinguished by the characteristics of their frequency spectra. FIG. 6A-FIG. 6D show plots of several representative navigation signals at the output 301 of the MDC 302 (see FIG. 3 and FIG. 4). The frequency (f) is plotted along the horizontal axis 602; the signal strength is plotted along the vertical axis 604.

Figure 6A:
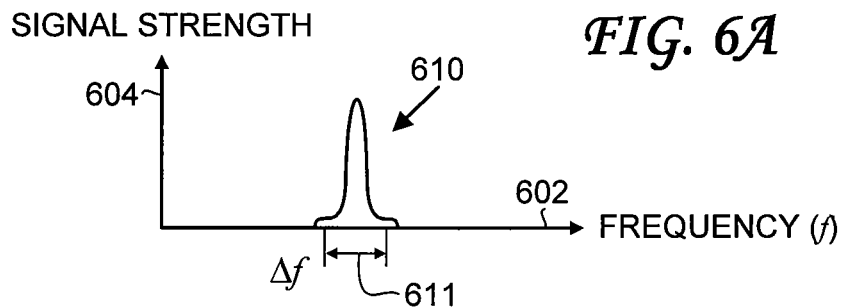
FIG. 6A-FIG. 6D show plots of direct and reflected signals as a function of frequency.

Plot 610 in FIG. 6A represents the frequency spectrum of a direct navigation signal. The spectral width Δf 611 is narrow. The frequency spectrum of the direct navigation signal received at the navigation receiver is Doppler-shifted relative to the frequency spectrum of the navigation signal transmitted from a navigation satellite, since the distance between the navigation receiver and the navigation satellite varies as a function of time.

Figure 6B:
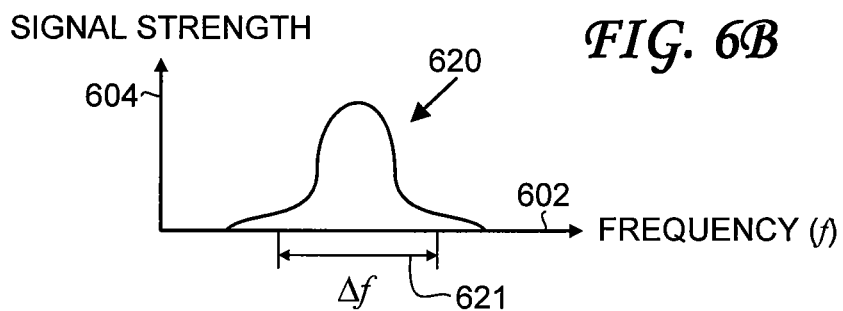

Plot 620 in FIG. 6B represents the frequency spectrum of a navigation signal reflected from an environmental surface. The frequency spectrum of the reflected navigation signal received at the navigation receiver is Doppler-shifted relative to the frequency spectrum of the navigation signal transmitted from a navigation satellite, since the distance between the navigation satellite and the environmental surface varies as a function of time, and the distance between the navigation receiver and the environmental surface varies as a function of time. In general, the shape of the frequency spectrum of a navigation signal reflected from an environmental surface is diffused. The spectral width Δf 621 is much wider than the spectral width Δf 611 of the direct navigation signal (FIG. 6A). The increase in spectral width, for example, is partly caused by mechanical vibrations in upper water layers (in the case of a water surface) or mechanical vibrations in vegetative cover (in the case of a ground surface). An increase in spectral width can also be caused by changes in the region of the environmental surface from which the navigation signals are reflected. Different regions can have different reflective spectral characteristics. For a navigation receiver mounted on a vehicle, the region of the environmental surface from which the navigation signals are reflected varies as a function of time.

The frequency spectrum of the navigation signal reflected from the environmental surface varies with the nature of the environmental surface. If the environmental surface is smooth and uniform (for example, paved asphalt), the frequency spectrum of the reflected navigation signal will be less diffused and similar to the frequency spectrum of the navigation signal reflected from an object (discussed below). During signal tracking, the frequency spectrum can vary substantially, since, as discussed above, the region of the environmental surface from which the navigation signals are reflected can vary as a function of time.

Figure 6C:
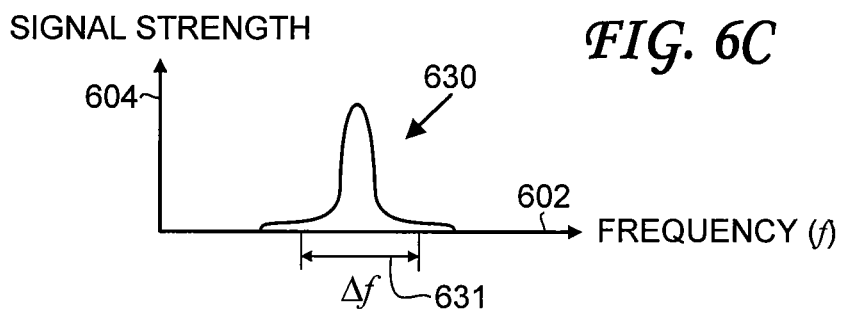
Figure 6D:
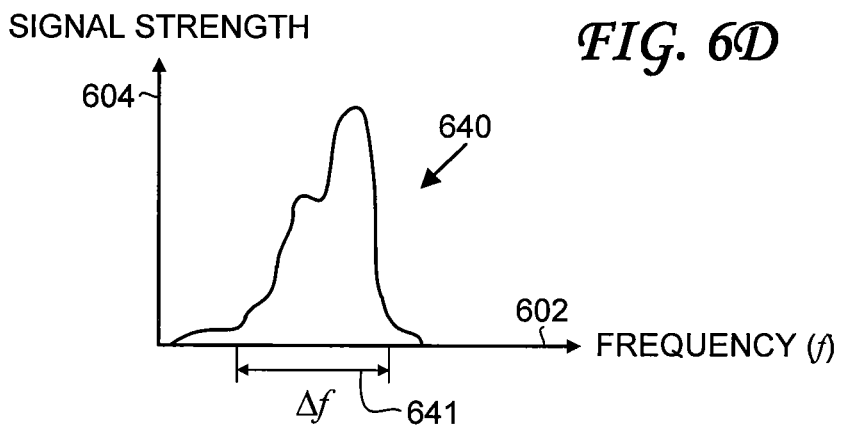

Plot 630 in FIG. 6C represents the frequency spectrum of a navigation signal reflected from an object. The frequency spectrum of the reflected navigation signal received at the navigation receiver is Doppler-shifted relative to the frequency spectrum of the navigation signal transmitted from a navigation satellite, since the distance between the navigation satellite and the object varies as a function of time, and the distance between the navigation receiver and the object varies as a function of time. Due to the non-isotropy of the object, the frequency spectrum can be slightly diffused. The spectral width Δf 631 shown in FIG. 6D is slightly broader than the spectral width Δf 611 of the direct navigation signal (FIG. 6A).

The spectral width Δf 631 is strongly dependent on the object. If a tree is the object, for example, the frequency spectrum will be much more diffused and similar to the frequency spectrum of the signal reflected from the environmental surface (FIG. 6B). During tracking, the frequency spectrum of the navigation signal reflected from an object changes only slightly, since the area on the object from which the navigation signals are reflected changes only slightly. Any change in the object position relative to the navigation receiver (for example, if the navigation receiver is mounted on a vehicle, and the vehicle makes a turn on the road) can cause a slight variation in the frequency spectrum. The variation in the frequency spectrum results from the Doppler shift because the distance between the navigation receiver and the object changes.

Figure 7A:
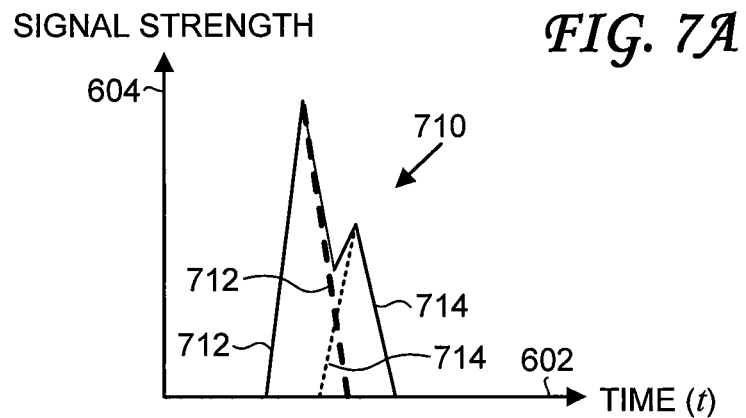
FIG. 7A-FIG. 7C show plots of superimposed direct and reflected signals.
Figure 7B:
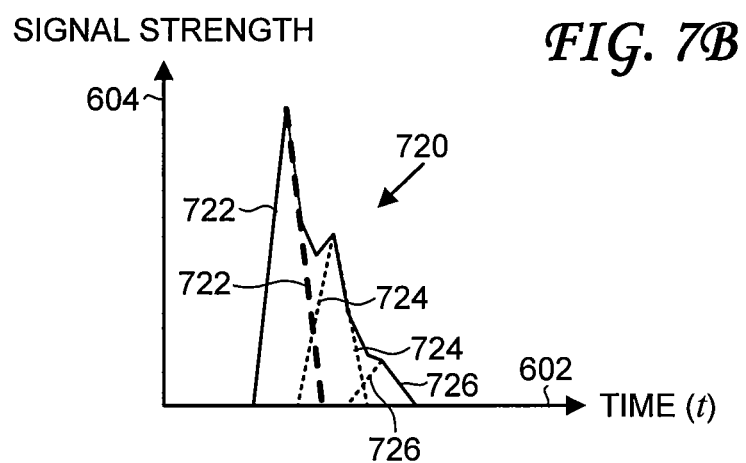
Figure 7C:
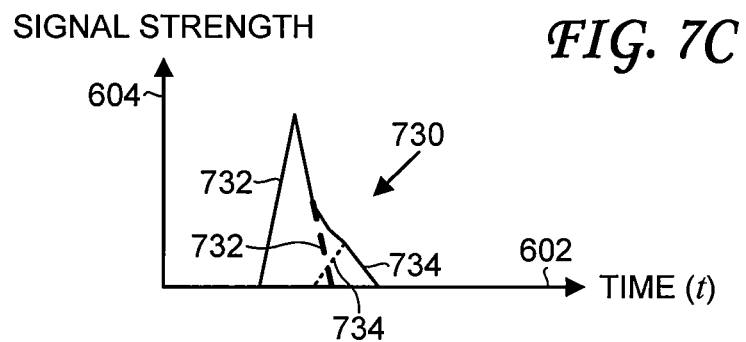

When the distance between the navigation receiver and the object or the distance between the navigation receiver and the environmental surface is small, various navigation signals can overlap. FIG. 7A-FIG. 7C show various overlapping signals in the time domain. In FIG. 7A, the combined signal 710 is the superposition of a direct signal 712 and a reflected signal 714 reflected from an environmental surface. In FIG. 7B, the combined signal 720 is the superposition of a direct signal 722, a reflected signal 724 reflected from an environmental surface, and a reflected signal 726 reflected from an object. In FIG. 7C, the combined signal 730 is the superposition of a direct signal 732 and a reflected signal 734 reflected from an object.

In the case of overlapping signals, spectral and time characteristics of the overlapping signals can be used to detect the presence of an object; in particular, an obstacle in the path of a vehicle. Accurate determination of the coordinates of the navigation receiver and the object becomes considerably more difficult, however.

In principle, fluctuations of the envelope curve (plot of the signal strength of the overlapping signals) at the output 301 of the MDC 302 can be analyzed in the time domain to resolve the three categories (types) of signals (direct signal, reflected signal reflected from an object, and reflected signal reflected from the environmental surface). In practice, the analysis is difficult.

Under some circumstances, separation of the three signal types is more readily accomplished in the frequency domain. FIG. 6D shows the frequency spectrum of overlapping signals. Due to the Doppler shift, the frequency spectrum of overlapping signals will be broad. The spectral width $\Delta f$ 641 is much broader than the spectral width $\Delta f$ 611 of the direct navigation signal (FIG. 6A).

A spectral width threshold can be applied in the frequency domain. If the spectral width is wider than the specified spectral width threshold, a decision about acquisition and lock-in of the overlapping signals is made. Then, additional threshold processing of the level of spectral components of the overlapping signals is used to separate the signals into the three categories. To improve the reliability of the signal separation process, however, independent analyses of the overlapping signals in both the time and frequency domains are performed and cross-checked for consistency.

To estimate the frequency spectrum, N digital signal samples at the output 301 of the MDC 302 are taken. The analysis of the spectral characteristics of the received navigation signals is implemented in the spectral processing unit 410 (FIG. 4). At the i-th time instant in each channel of the navigation receiver, the Fast Fourier Transform (FFT) algorithm is used for analysis. The FFT algorithm is well known to those skilled in the art; further details are not discussed herein.

In the process of tracking, the frequency spectrum is estimated several times. The results (output 405) are written into the RAM 306 for further signal separation in the signal separation unit B 430. To separate signals, some parameters, such as spectral width or changes in spectral width over a few tracking cycles, are determined. The number of tracking cycles depends on various criteria, such as the change in the magnitude of the spectral width of the reflected signal reflected from the environmental surface during motion of the vehicle.

Figure 10:
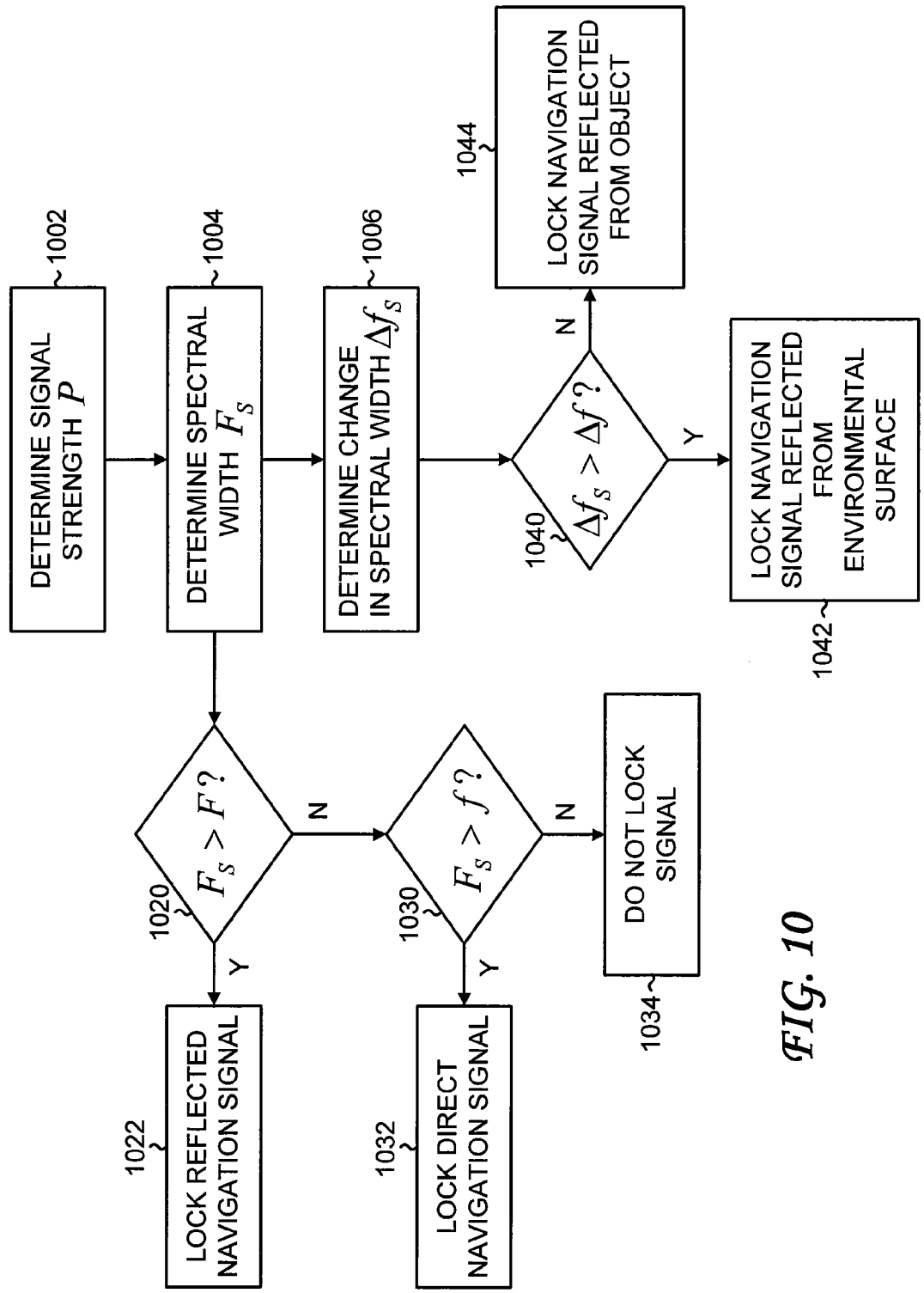
FIG. 10 shows a flowchart of a method for separating direct and reflected navigation signals based on spectral characteristics.

An algorithm for separation of signals based on spectral characteristics is described below and summarized in the flowchart shown in FIG. 10. In step 1002, the signal strength P is determined according to:

$$P = \sum_{k=0}^{N-1} |X(k)|^2. \quad \text{(E1)}$$

Here, X (k) is the k-th harmonic of the frequency spectrum of the navigation signal, and N is an integer. Then, by successively reducing the number of harmonics, the frequency range within which a specific signal strength value is contained (for example, 90% of the signal strength) is determined. Decreasing the number of harmonics by one, find the signal strength $P_S(1)$ in the reduced frequency range and compare it to the threshold signal strength $0.9 \cdot P$. If the computed signal strength is greater than the threshold signal strength [that is, if $P_S(1) > 0.9 \cdot P$], the number of harmonics is decreased by one again. The calculation is iterated until the signal strength $P_S(i)$ at the i-th step is smaller than the threshold signal strength: $P_S(i) < 0.9 \cdot P$, where $$P_s(i) = \sum_{k=0}^{N-1-i} |X(k)|^2. \quad \text{(E2)}$$

In step 1004, the spectral width $F_S$ is determined according to:

$$F_S = (N-i) \cdot f_0, \quad \text{(E3)}$$

where i (determined above) is the number of the rejected harmonics and $f_0$ is the interval between harmonics. Estimation of the spectral width is performed at each tracking cycle. Estimation of changes in spectral width is estimated over several tracking cycles. In step 1006, a change in spectral width is determined as the magnitude of the difference between the spectral width at consecutive tracking cycles, such as the j-th and (j+1)-th tracking cycles:

$$\Delta f_S = |F_S(j) - F_S(j+1)|. \quad \text{(E4)}$$

In step 1020, the spectral width of the navigation signal at the j-th time instant is compared with the threshold spectral width F. If the spectral width $F_S$ exceeds the threshold spectral width F (that is, $F_S > F$), then the process passes to step 1022, and a decision about acquisition and lock-in of the reflected signal is reached. If the spectral width $F_S$ does not exceed the threshold spectral width F, then the process passes to step 1030, in which the spectral width is compared with a threshold spectral width f<F. If the spectral width $F_S$ exceeds the threshold spectral width f (that is, $f < F_S < F$), then the process passes to step 1032, and a decision about acquisition and lock-in of the direct signal is taken. If the spectral width $F_S$ does not exceed the threshold spectral width f, then the process passes to step 1034, and the signal is not acquired and locked in. A minimum threshold spectral width f is set because a signal with too narrow a spectral width can be indicative of an interference signal, either unintentional or intentional (intentional interference, for example, can correspond to a jamming signal).

In step 1040, the change in the spectral width of the reflected signals is compared with the threshold change in spectral width Δf. If the change in the spectral width (during tracking), $\Delta f_S$, has substantially changed and exceeded the threshold Δf (that is, $\Delta f_S > \Delta f$), then the process passes to step 1042, and a decision about acquisition and lock-in of the navigation signal reflected from the environmental surface is reached. Navigation signals reflected from the environmental surface are isolated and eliminated from further processing. Navigation signals reflected from the environmental surface are not used in calculating the position of a navigation receiver or an object reflecting a navigation signal. If the change in spectral width $\Delta f_S$ has changed only slightly and has not exceeded the threshold Δf, then the process passes to step 1044, and a decision about acquisition and lock-in of the navigation signal reflected from the object is reached. Navigation signals reflected from the object are used in calculating the position of the object in the reflector coordinates calculation unit 342.

Direct navigation signals (output 421 and output 417 in FIG. 4) are fed into the direct signal delays measurement unit 330 for further processing. The coordinates of the navigation receiver are then calculated by the navigation receiver pseudo-ranges calculation unit 332 and the navigation receiver coordinates calculation unit 334 according to the algorithms below.

The delay times (pseudo-delays) $\tau_{j\ dir}$ of the direct navigation signals transmitted from the j-th navigation satellite to the navigation receiver are determined in the direct signal delays measurement unit 330. Based on the pseudo-delays, the pseudo-range $R_{j\ dir}$ the j-th navigation satellite to the navigation receiver is calculated in the navigation receiver pseudo-ranges calculation unit 332: $R_{j\ dir} = \tau_{j\ dir} \cdot c$, where c is the radio wave propagation speed. Based on the calculated pseudo-ranges (at least four), the position (coordinates) of the navigation receiver are calculated by the navigation receiver coordinates calculation unit 334.

Navigation signals reflected from the object (output 431 and output 415) are fed into the reflected signal delays measurement unit 340 for further processing. The coordinates of the object are then calculated by the reflector pseudo-range differences calculation unit 342 and the reflector coordinates calculation unit 344 according to the algorithms below.

In practice, the characteristics in the time domain and in the frequency domain of signals reflected from the environmental surface and from an object vary widely. Refer to FIG. 4. If differences in signals reflected from the environmental surface and the object are substantially more strongly differentiated in the time domain than in the frequency domain, then the decision about object detection is reached in the signal separation unit A 320, and the output signal 415 is fed into the reflected signal delays measurement unit 340. If the differences in signals reflected from the environmental surface and from the object are substantially more strongly differentiated in the frequency domain than in the time domain, then the decision about object detection is reached in the signal separation unit B 430, and the output signal 431 is fed into the reflected signal delays measurement unit 340.

In general, information for object detection is provided by both time-domain analysis and frequency-domain analysis. The decision about object detection is reached in both the signal separation unit A 320 and the signal separation unit B 430; both output signal 415 and output signal 431 are fed into the reflected signal delays measurement unit 340: a joint decision increases the probability of correct object detection.

The delay times (pseudo-delays) $\tau_{j\ refl}$ for navigation signals transmitted from the j-th navigation satellite and then reflected from an object to the navigation receiver are determined in the reflected signal delays measurement unit 340.

Based on the pseudo-delays, the pseudo-range $R_{j\ refl}$ from the j-th navigation satellite to the navigation receiver is calculated in the reflector pseudo-range differences calculation unit 342: $R_{j\ refl} = \tau_{j\ refl} \cdot c$. The pseudo-range $R_{j\ refl}$ is the sum of the following components: $R_{j\ refl} = R_{j\ r} + R_r + c \cdot \tau$, where $R_{j\ r}$ is the range from the j-th navigation satellite to the object, $R_r$ is the distance from the object to the navigation receiver, c is the radio wave propagation speed, and τ is the clock offset of the navigation receiver relative to the system time.

Differences between pseudo-ranges from different navigation satellites to the navigation receiver are also calculated in the reflector pseudo-range differences calculation unit 342:

$$\Delta R_1 = R_{1refl} - R_{2refl} \tag{E5}$$
$$= R_{1r} + R_r + c \cdot \tau - R_{2r} - R_r - c \cdot \tau$$
$$= R_{1r} - R_{2r}$$

$$\Delta R_2 = R_{2refl} - R_{3refl} \tag{E6}$$
$$= R_{2r} + R_r + c \cdot \tau - R_{3r} - R_r - c \cdot \tau$$
$$= R_{2r} - R_{3r}$$

$$\Delta R_3 = R_{3refl} - R_{1refl} \tag{E7}$$
$$= R_{3r} + R_r + c \cdot \tau - R_{1r} - R_r - c \cdot \tau$$
$$= R_{3r} - R_{1r}.$$

Note that the pseudo-range differences ($\Delta R_1$, $\Delta R_2$, $\Delta R_3$) do not depend on the distance from the object to the navigation receiver ($R_r$) and do not depend on the clock offset of the navigation receiver relative to the system time (τ); they depend only on the distances from the navigation satellites (three or more) to the object. The position of the object is calculated in the reflector coordinates calculation unit 344 as an intersection point of hyperboloids plotted according to the equations for ($\Delta R_1$, $\Delta R_2$, $\Delta R_3$). Note that the position of an object can be determined even if the navigation receiver does not receive direct navigation signals.

Figure 8:
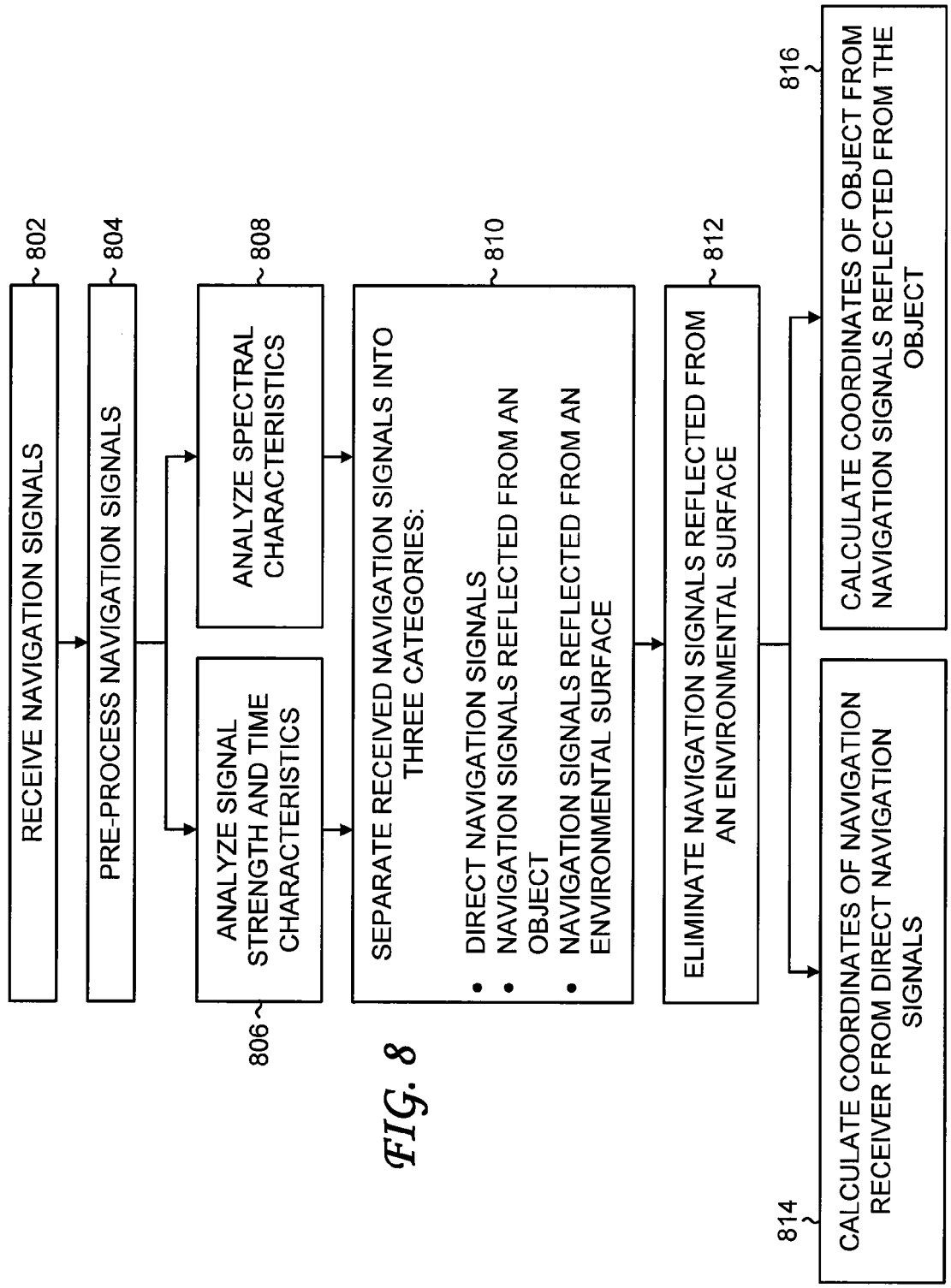
FIG. 8 shows a flowchart of a method for calculating the coordinates of a navigation receiver and an object.

FIG. 8 shows a flowchart of a method, according to an embodiment of the invention, for determining the location of a navigation receiver and an object. In step 802, navigation signals are received from multiple navigation satellites 104 (FIG. 1) at the antenna 202 of the navigation receiver 204 (FIG. 2). In step 804, the received navigation signals are pre-processed by the pre-processing unit 210. The pre-processed navigation signals are then processed by the processing unit 220.

In step 806, the pre-processed navigation signals are analyzed based on their signal strength and time characteristics. In step 808, the pre-processed signals are analyzed based on their spectral characteristics. The process then passes to step 810, in which the navigation signals are separated into three categories based on the signal strength and time characteristics alone, based on the spectral characteristics alone, or based on both the signal strength and time characteristics and on the spectral characteristics. The three categories are the following: (1) direct navigation signals, (2) navigation signals reflected from an object, and (3) navigation signals reflected from an environmental surface.

The process then passes to step 812, in which navigation signals reflected from an environmental surface are eliminated from further processing. In step 814, the coordinates of the navigation receiver are calculated from the direct navigation signals. In step 816, the coordinates of the object are calculated from the navigation signals reflected from the object.

Figure 11:
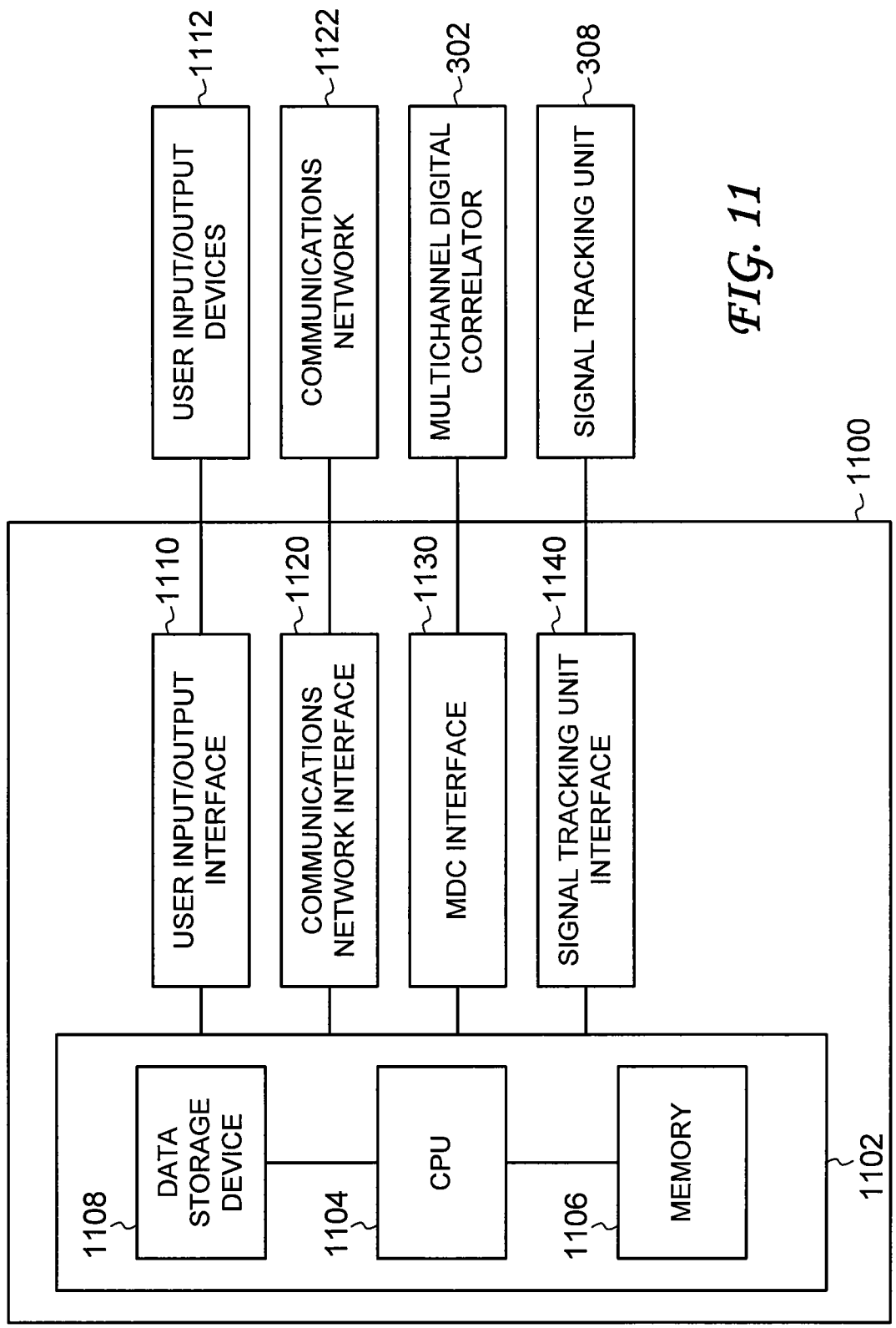
FIG. 11 shows a high-level schematic of a computational system configured to calculate the coordinates of a navigation receiver and an object.

FIG. 11 shows a high-level schematic of a computational system, according to an embodiment of the invention, for determining the location of a navigation receiver and an object. One skilled in the art can construct the computational system 1100 from various combinations of hardware, firmware, and software. One skilled in the art can construct the computational system 1100 from various electronic components, including one or more general purpose processors (such as microprocessors), one or more digital signal processors, one or more application-specific integrated circuits (ASICs), and one or more field-programmable gate arrays (FPGAs).

The computational system 1100 includes a computer 1102, which includes a processor [referred to as the central processing unit (CPU)] 1104, memory 1106, and a data storage device 1108. The data storage device 1108 includes at least one persistent, non-transitory, tangible computer readable medium, such as non-volatile semiconductor memory, a magnetic hard drive, or a compact disc read only memory.

The computational system 1100 further includes a user input/output interface 1110, which interfaces the computer 1102 to user input/output devices 1112. Examples of user input/output devices 1112 include a keyboard, a mouse, a local access terminal, and a video display. Data, including computer executable code, can be transferred to and from the computer 1102 via the user input/output interface 1110.

The computational system 1100 further includes a communications network interface 1120, which interfaces the computer 1102 with a communications network 1122. Examples of the communications network 1122 include a local area network and a wide area network. A user can access the computer 1102 via a remote access terminal (not shown) communicating with the communications network 1122. Data, including computer executable code, can be transferred to and from the computer 1102 via the communications network interface 1120. Other systems, such as an automated navigation system or automated vehicle guidance system, can communicate with the computational system 1100 via the communications network interface 1120 directly or via the communications network 1122.

The computational system 1100 further includes a multichannel digital correlator (MDC) interface 1130, which interfaces the computer 1102 with the MDC 302 (FIG. 3).

The computational system 1100 further includes a signal tracking unit interface 1140, which interfaces the computer 1102 with the signal tracking unit 308 (FIG. 3).

As is well known, a computer operates under control of computer software, which defines the overall operation of the computer and applications. The CPU 1104 controls the overall operation of the computer and applications by executing computer program instructions that define the overall operation and applications. The computer program instructions can be stored in the data storage device 1108 and loaded into the memory 1106 when execution of the program instructions is desired. The algorithms shown schematically in FIG. 8-FIG. 10 can be defined by computer program instructions stored in the memory 1106 or in the data storage device 1108 (or in a combination of the memory 1106 and the data storage device 1108) and controlled by the CPU 1104 executing the computer program instructions. For example, the computer program instructions can be implemented as computer executable code programmed by one skilled in the art to perform algorithms. Accordingly, by executing the computer program instructions, the CPU 1104 executes the algorithms shown schematically in FIG. 8-FIG. 10.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for processing a plurality of groups of navigation signals with a navigation receiver mounted on a moving vehicle, the method comprising the steps of:
    receiving, at the navigation receiver mounted on the moving vehicle, the plurality of groups of navigation signals, wherein each particular group of navigation signals in the plurality of groups of navigation signals corresponds to a particular global navigation satellite in a plurality of global navigation satellites;
    for each group of navigation signals in the plurality of groups of navigation signals:
        separating the group of navigation signals into a first set of navigation signals and a second set of navigation signals, wherein:
            each navigation signal in the first set of navigation signals is a direct navigation signal; and
            each navigation signal in the second set of navigation signals is a reflected navigation signal;
        separating the second set of navigation signals into a first subset of navigation signals and a second subset of navigation signals, wherein:
            each navigation signal in the first subset of navigation signals is a navigation signal reflected from an object; and
            each navigation signal in the second subset of navigation signals is a navigation signal reflected from an environmental surface; and
    detecting the object based at least in part on the first subset of navigation signals in each group of navigation signals in the plurality of groups of navigation signals.

2. The method of claim 1, further comprising the step of:
    determining a position of the object based at least in part on the first subset of navigation signals in each group of navigation signals in the plurality of groups of navigation signals.

3. The method of claim 1, further comprising the steps of:
    determining whether the object is in a path of the moving vehicle; and
    upon determining that the object is in the path of the moving vehicle, generating a command to avoid a collision between the moving vehicle and the object.

4. The method of claim 3, wherein the command to avoid a collision between the moving vehicle and the object comprises a command to:
    stop the moving vehicle;
    steer the moving vehicle around the object; or
    send an alarm.

5. The method of claim 1, wherein for each group of navigation signals in the plurality of groups of navigation signals, the step of separating the group of navigation signals into a first set of navigation signals and a second set of navigation signals comprises the steps of:
    for each navigation signal in the group of navigation signals:
        determining a signal strength of the navigation signal;

determining a propagation time of the navigation signal; and assigning the navigation signal to the first set of navigation signals or to the second set of navigation signals based at least in part on the signal strength of the navigation signal and the propagation time of the navigation signal.

6. The method of claim 1, wherein, for each group of navigation signals in the plurality of groups of navigation signals, the step of separating the group of navigation signals into a first set of navigation signals and a second set of navigation signals comprises the steps of:

for each navigation signal in the group of navigation signals:

determining a signal strength $U(i)$ at a time instant i;
comparing $U(i)$ with a first user-defined threshold h;
upon determining that $U(i)>h$, comparing $U(i)$ to a second user-defined threshold H, wherein H>h;
upon determining that $U(i)>H$, comparing $U(i)$ with a user-defined sequence of increasing thresholds, wherein the user-defined sequence of increasing thresholds has a user-defined maximum threshold KH; and
upon determining that $U(i)$ exceeds each threshold in the user-defined sequence of increasing thresholds, assigning the navigation signal to the first set of navigation signals.

7. The method of claim 6, wherein, for each group of navigation signals in the plurality of groups of navigation signals, the user-defined sequence of increasing thresholds is a first user-defined sequence of increasing thresholds, and the step of separating the group of navigation signals into a first set of navigation signals and a second set of navigation signals further comprises the steps of:

for each navigation signal in the group of navigation signals:

upon determining that $U(i) \leq h$, determining a signal strength $U(i+1)$ at a time instant i+1;
comparing $U(i+1)$ with the first user-defined threshold h;
upon determining that $U(i+1)>h$, comparing $U(i+1)$ with a second user-defined sequence of increasing thresholds, wherein the second user-defined sequence of increasing thresholds has a user-defined maximum threshold kh; and
upon determining that $U(i+1)$ exceeds each threshold in the second user-defined sequence of increasing thresholds, assigning the navigation signal to the second set of navigation signals.

8. The method of claim 7, wherein, for each group of navigation signals in the plurality of groups of navigation signals, the step of separating the group of navigation signals into a first set of navigation signals and a second set of navigation signals further comprises the steps of:

for each navigation signal in the group of navigation signals:

upon determining that $h<U(i)<H$, comparing $U(i)$ with a user-defined threshold 2h;
upon determining that $U(i)>2h$, comparing $U(i)$ with a third user-defined sequence of increasing thresholds, wherein the third user-defined sequence of increasing thresholds has the user-defined maximum threshold kh; and
upon determining that $U(i)$ exceeds each threshold in the third user-defined sequence of increasing thresholds, assigning the navigation signal to the second set of navigation signals.

9. The method of claim 6, wherein, for each group of navigation signals in the plurality of groups of navigation signals, the step of separating the second set of navigation signals into a first subset of navigation signals and a second subset of navigation signals comprises the steps of:

for each navigation signal in the second set of navigation signals:

determining whether a signal strength of the navigation signal is increasing during a signal tracking interval starting at a first time instant less than the time instant i;
upon determining that the signal strength is not increasing over the signal tracking interval, assigning the navigation signal to the second subset of navigation signals; and
upon determining that the signal strength is increasing over the signal tracking interval:
comparing $U(i)$ with a third user-defined threshold $h+\Delta h$, wherein $h+\Delta h<H$;
upon determining that $h+\Delta h<U(i)<H$, assigning the navigation signal to the first subset of navigation signals; and
upon determining that $h<U(i)$ $h+\Delta h$ assigning the navigation signal to the second subset of navigation signals.

10. The method of claim 1, wherein, for each group of navigation signals in the plurality of groups of navigation signals, the step of separating the group of navigation signals into a first set of navigation signals and a second set of navigation signals comprises the steps of:

for each navigation signal in the group of navigation signals:

determining a spectral width of the navigation signal; and
assigning the navigation signal to the first set of navigation signals or to the second set of navigation signals based at least in part on the spectral width of the navigation signal.

11. The method of claim 10, wherein, for each group of navigation signals in the plurality of groups of navigation signals, the step of separating the second set of navigation signals into a first subset of navigation signals and a second subset of navigation signals comprises the step of:

for each navigation signal in the second set of navigation signals:

assigning the navigation signal to the first subset of navigation signals or to the second subset of navigation signals based at least in part on the spectral width of the navigation signal.

12. The method of claim 1, wherein, for each group of navigation signals in the plurality of groups of navigation signals, the step of separating the group of navigation signals into a first set of navigation signals and a second set of navigation signals comprises the steps of:

for each navigation signal in the group of navigation signals:

determining a spectral width $F_S$ of the navigation signal;
comparing the spectral width $F_S$ with a first user-defined threshold spectral width F;
upon determining that $F_S>F$, assigning the navigation signal to the second set of navigation signals;
upon determining that $F_S \leq F$, comparing the spectral width $F_S$ with a second user-defined threshold spectral width f, wherein f<F; and
upon determining that $F_S>f$, assigning the navigation signal to the first set of navigation signals.

13. The method of claim 1, wherein, for each group of navigation signals in the plurality of groups of navigation signals, the step of separating the second set of navigation signals into a first subset of navigation signals and a second subset of navigation signals comprises the steps of:
   for each navigation signal in the second set of navigation signals:
      determining a change in spectral width $\Delta f_S$;
      comparing the change in spectral width $\Delta f_S$ with a user-defined threshold change in spectral width $\Delta f$;
      upon determining that $\Delta f_S > \Delta f$, assigning the navigation signal to the second subset of navigation signals; and
      upon determining that $\Delta f_S \leq \Delta f$, assigning the navigation signal to the first subset of navigation signals.

14. A non-transitory computer readable medium storing computer program instructions for detecting an object, the computer program instructions defining the steps of:
   receiving, at a navigation receiver mounted on a moving vehicle, a plurality of groups of navigation signals, wherein each particular group of navigation signals in the plurality of groups of navigation signals corresponds to a particular global navigation satellite in a plurality of global navigation satellites;
   for each group of navigation signals in the plurality of groups of navigation signals:
      separating the group of navigation signals into a first set of navigation signals and a second set of navigation signals, wherein:
         each navigation signal in the first set of navigation signals is a direct navigation signal; and
         each navigation signal in the second set of navigation signals is a reflected navigation signal;
      separating the second set of navigation signals into a first subset of navigation signals and a second subset of navigation signals, wherein:
         each navigation signal in the first subset of navigation signals is a navigation signal reflected from the object; and
         each navigation signal in the second subset of navigation signals is a navigation signal reflected from an environmental surface; and
   detecting the object based at least in part on the first subset of navigation signals in each group of navigation signals in the plurality of groups of navigation signals.

15. The non-transitory computer readable medium of claim 14, wherein the computer program instructions for detecting an object further comprise computer program instructions defining the step of:
   determining a position of the object based at least in part on the first subset of navigation signals in each group of navigation signals in the plurality of groups of navigation signals.

16. The non-transitory computer readable medium of claim 14, wherein the computer program instructions for detecting an object further comprise computer program instructions defining the steps of:
   determining whether the object is in a path of the moving vehicle; and
   upon determining that the object is in the path of the moving vehicle, generating a command to avoid a collision between the moving vehicle and the object.

17. The non-transitory computer readable medium of claim 16, wherein the command to avoid a collision between the moving vehicle and the object comprises a command to:
   stop the moving vehicle;
   steer the moving vehicle around the object; or
   send an alarm.

18. The non-transitory computer readable medium of claim 14, wherein the computer program instructions defining, the step of, for each group of navigation signals in the plurality of groups of navigation signals, separating the group of navigation signals into a first set of navigation signals and a second set of navigation signals comprise computer program instructions defining the steps of:
   for each navigation signal in the group of navigation signals:
      determining a signal strength of the navigation signal;
      determining a propagation time of the navigation signal; and
      assigning the navigation signal to the first set of navigation signals or to the second set of navigation signals based at least in part on the signal strength of the navigation signal and the propagation time of the navigation signal.

19. The non-transitory computer readable medium of claim 14, wherein, the computer program instructions defining, the step of, for each group of navigation signals in the plurality of groups of navigation signals, separating the group of navigation signals into a first set of navigation signals and a second set of navigation signals comprise computer program instructions defining the steps of:
   for each navigation signal in the group of navigation signals:
      determining a signal strength $U(i)$ at a time instant i;
      comparing $U(i)$ with a first user-defined threshold h;
      upon determining that $U(i) > h$, comparing $U(i)$ to a second user-defined threshold H, wherein $H > h$;
      upon determining that $U(i) > H$, comparing $U(i)$ with a user-defined sequence of increasing thresholds, wherein the user-defined sequence of increasing thresholds has a user-defined maximum threshold KH; and
      upon determining that $U(i)$ exceeds each threshold in the user-defined sequence of increasing thresholds, assigning the navigation signal to the first set of navigation signals.

20. The non-transitory computer readable medium of claim 19, wherein for each group of navigation signals in the plurality of groups of navigation signals, the user-defined sequence of increasing thresholds is a first user-defined sequence of increasing thresholds, and wherein the computer program instructions defining the step of, for each group of navigation signals in the plurality of groups of navigation signals, separating the group of navigation signals into a first set of navigation signals and a second set of navigation signals further comprise computer program instructions defining the steps of:
   for each navigation signal in the group of navigation signals:
      upon determining that $U(i) \leq h$, determining a signal strength $U(i+1)$ at a time instant i+1;
      comparing $U(i+1)$ with the first user-defined threshold h
      upon determining that $U(i+1) > H$, comparing $U(i+1)$ with a second user-defined sequence of increasing thresholds, wherein the second user-defined sequence of increasing thresholds has a user-defined maximum threshold kh; and
      upon determining that $U(i+1)$ exceeds each threshold in the second user-defined sequence of increasing thresholds, assigning the navigation signal to the second set of navigation signals.

21. The non-transitory computer readable medium of claim 20, wherein the computer program instructions defining the step of, for each group of navigation signals in the plurality of groups of navigation signals, separating the group of navigation signals into a first set of navigation signals and a second set of navigation signals further comprise computer program instructions defining the steps of:

for each navigation signal in the group of navigation signals:
  upon determining that h<U(i)<H, comparing U(i) with a user-defined threshold 2h;
  upon determining that U(i)>2h, comparing U(i) with a third user-defined sequence of increasing thresholds, wherein the third user-defined sequence of increasing thresholds has the user-defined maximum threshold kh; and
  upon determining that U(i) exceeds each threshold in the third user-defined sequence of increasing thresholds, assigning the navigation signal to the second set of navigation signals.

22. The non-transitory computer readable medium of claim 20, wherein the computer program instructions defining the step of, for each group of navigation signals in the plurality of groups of navigation signals, separating the second set of navigation signals into a first subset of navigation signals and a second subset of navigation signals comprise computer program instructions defining the steps of:

for each navigation signal in the second set of navigation signals:
  determining whether a signal strength of the navigation signal is increasing during a signal tracking interval starting at a first time instant less than the time instant i;
  upon determining that the signal strength is not increasing over the signal tracking interval, assigning the navigation signal to the second subset of navigation signals; and
  upon determining that the signal strength is increasing over the signal tracking interval:
   comparing U(i) with a third user-defined threshold h+Δh, wherein h+Δh<H;
   upon determining that h+Δh<U(i)<H, assigning the navigation signal to the first subset of navigation signals; and
   upon determining that h<U(i)≤h+Δh assigning the navigation signal to the second subset of navigation signals.

23. The non-transitory computer readable medium of claim 14, wherein the computer program instructions defining the step of, for each group of navigation signals in the plurality of groups of navigation signals, separating the group of navigation signals into a first set of navigation signals and a second set of navigation signals comprise computer program instructions defining the steps of:

for each navigation signal in the group of navigation signals:
  determining a spectral width of the navigation signal; and
  assigning the navigation signal to the first set of navigation signals or to the second set of navigation signals based at least in part on the spectral width of the navigation signal.

24. The non-transitory computer readable medium of claim 23, wherein the computer program instructions defining the step of, for each group of navigation signals in the plurality of groups of navigation signals, separating the second set of navigation signals into a first subset of navigation signals and a second subset of navigation signals comprise computer program instructions defining the step of:

for each navigation signal in the second set of navigation signals:
  assigning the navigation signal to the first subset of navigation signals or to the second subset of navigation signals based at least in part on the spectral width of the navigation signal.

25. The non-transitory computer readable medium of claim 14, wherein the computer program instructions defining the step of, for each group of navigation signals in the plurality of groups of navigation signals, separating the group of navigation signals into a first set of navigation signals and a second set of navigation signals comprise computer program instructions defining the steps of:

for each navigation signal in the group of navigation signals:
  determining a spectral width $F_S$ of the navigation signal;
  comparing the spectral width $F_S$ with a first user-defined threshold spectral width F;
  upon determining that $F_S$>F, assigning the navigation signal to the second set of navigation signals;
  upon determining that $F_S$≤F, comparing the spectral width $F_S$ with a second user-defined threshold spectral width f, wherein f<F; and
  upon determining that $F_S$>f, assigning the navigation signal to the first set of navigation signals.

26. The non-transitory computer readable medium of claim 14, wherein the computer program instructions defining the step of, for each group of navigation signals in the plurality of groups of navigation signals, separating the second set of navigation signals into a first subset of navigation signals and a second subset of navigation signals comprise computer program instructions defining the steps of:

for each navigation signal in the second set of navigation signals:
  determining a change in spectral width $\Delta f_S$;
  comparing the change in spectral width $\Delta f_S$ with a user-defined threshold change in spectral width $\Delta f$;
  upon determining that $\Delta f_S$>$\Delta f$, assigning the navigation signal to the second subset of navigation signals; and
  upon determining that $\Delta f_S$≤$\Delta f$, assigning the navigation signal to the first subset of navigation signals.

27. A navigation receiver, which, when mounted on a moving vehicle, detects an object, the navigation receiver comprising:

a pre-processing unit configured to:
  receive, from an antenna, a plurality of groups of navigation signals, wherein each particular group of navigation signals in the plurality of groups of navigation signals corresponds to a particular global navigation satellite in a plurality of global navigation satellites; and
  generate an output digital signal based at least in part on the plurality of groups of navigation signals; and
 a processing unit operably coupled to the pre-processing unit, wherein the processing unit is configured to:
  receive the output digital signal;
  separate the group of navigation signals into a first set of navigation signals and a second set of navigation signals, wherein:
   each navigation signal in the first set of navigation signals is a direct navigation signal; and
   each navigation signal in the second set of navigation signals is a reflected navigation signal;
  separate the second set of navigation signals into a first subset of navigation signals and a second subset of navigation signals, wherein:

each navigation signal in the first subset of navigation signals is a navigation signal reflected from the object; and each navigation signal in the second subset of navigation signals is a navigation signal reflected from an environmental surface; and detect the object based at least in part on the first subset of navigation signals in each group of navigation signals in the plurality of groups of navigation signals.

28. The navigation receiver of claim 27, wherein the processing unit is further configured to:

determine a position of the object based at least in part on the first subset of navigation signals in each group of navigation signals in the plurality of groups of navigation signals.

29. The navigation receiver of claim 27, wherein the processing unit is further configured to:

determine whether the object is in a path of the moving vehicle; and upon determining that the object is in the path of the moving vehicle, generate a command to avoid a collision between the moving vehicle and the object.

30. The navigation receiver of claim 29, wherein the command to avoid a collision between the moving vehicle and the object comprises a command to:

stop the moving vehicle;

steer the moving vehicle around the object; or send an alarm.

31. The navigation receiver of claim 27, wherein the processing unit is further configured to:

for each navigation signal in the group of navigation signals:

determine a signal strength of the navigation signal;

determine a propagation time of the navigation signal; and assign the navigation signal to the first set of navigation signals or to the second set of navigation signals based at least in part on the signal strength of the navigation signal and the propagation time of the navigation signal.

32. The navigation receiver of claim 27, wherein the processing unit is further configured to:

for each navigation signal in the group of navigation signals:

determine a signal strength $U(i)$ at a time instant i;

compare $U(i)$ with a first user-defined threshold h;

upon determining that $U(i)>h$, compare $U(i)$ to a second user-defined threshold H, wherein $H>h$;

upon determining that $U(i)>H$, compare $U(i)$ with a user-defined sequence of increasing thresholds, wherein the user-defined sequence of increasing thresholds has a user-defined maximum threshold KH; and upon determining that $U(i)$ exceeds each threshold in the user-defined sequence of increasing thresholds, assign the navigation signal to the first set of navigation signals.

33. The navigation receiver of claim 32, wherein:

for each group of navigation signals in the plurality of groups of navigation signals, the user-defined sequence of increasing thresholds is a first user-defined sequence of increasing thresholds; and the processing unit is further configured to:

for each navigation signal in the group of navigation signals:

upon determining that $U(i) \leq h$, determine a signal strength $U(i+1)$ at a time instant i+1;

compare $U(i+1)$ with the first user-defined threshold h;

upon determining that $U(i+1)>h$, compare $U(i+1)$ with a second user-defined sequence of increasing thresholds, wherein the second user-defined sequence of increasing thresholds has a user-defined maximum threshold kh; and upon determining that $U(i+1)$ exceeds each threshold in the second user-defined sequence of increasing thresholds, assign the navigation signal to the second set of navigation signals.

34. The navigation receiver of claim 33, wherein the processing unit is further configured to:

for each navigation signal in the group of navigation signals:

upon determining that $h<U(i)<H$, compare $U(i)$ with a user-defined threshold 2h;

upon determining that $U(i)>2h$, compare $U(i)$ with a third user-defined sequence of increasing thresholds, wherein the third user-defined sequence of increasing thresholds has the user-defined maximum threshold kh; and upon determining that $U(i)$ exceeds each threshold in the third user-defined sequence of increasing thresholds, assign the navigation signal to the second set of navigation signals.

35. The navigation receiver of claim 32, wherein the processing unit is further configured to:

for each navigation signal in the second set of navigation signals:

determine whether a signal strength of the navigation signal is increasing during a signal tracking interval starting at a first time instant less than the time instant i;

upon determining that the signal strength is not increasing over the signal tracking interval, assign the navigation signal to the second subset of navigation signals; and upon determining that the signal strength is increasing over the signal tracking interval:

compare $U(i)$ with a third user-defined threshold $h+\Delta h$, wherein $h+\Delta h<H$;

upon determining that $h+\Delta h<U(i)<H$, assign the navigation signal to the first subset of navigation signals; and upon determining that $h<U(i)\leq h+\Delta h$ assign the navigation signal to the second subset of navigation signals.

36. The navigation receiver of claim 27, wherein the processing unit is further configured to:

for each navigation signal in the group of navigation signals:

determine a spectral width of the navigation signal; and assign the navigation signal to the first set of navigation signals or to the second set of navigation signals based at least in part on the spectral width of the navigation signal.

37. The navigation receiver of claim 36, wherein the processing unit is further configured to:

for each navigation signal in the second set of navigation signals:

assign the navigation signal to the first subset of navigation signals or to the second subset of navigation signals based at least in part on the spectral width of the navigation signal.

38. The navigation receiver of claim 27, wherein the processing unit is further configured to:

for each navigation signal in the group of navigation signals:
  determine a spectral width $F_S$ of the navigation signal;
  compare the spectral width $F_S$ with a first user-defined threshold spectral width F;
  upon determining that $F_S \leq F$, assign the navigation signal to the second set of navigation signals;
  upon determining that $F_S < F$, compare the spectral width $F_S$ with a second user-defined threshold spectral width f, wherein f<F; and
upon determining that $F_S > f$, assign the navigation signal to the first set of navigation signals.

39. The navigation receiver of claim 27, wherein the processing unit is further configured to:
for each navigation signal in the second set of navigation signals:
  determine a change in spectral width $\Delta f_S$;
  compare the change in spectral width $\Delta f_S$ with a user-defined threshold change in spectral width $\Delta f$;
  upon determining that $\Delta f_S > \Delta f$, assign the navigation signal to the second subset of navigation signals; and
  upon determining that $\Delta f_S \Delta f$, assign the navigation signal to the first subset of navigation signals.

\* \* \* \* \*